United States Patent
Toya et al.

(10) Patent No.: US 9,007,675 B2
(45) Date of Patent: Apr. 14, 2015

(54) OPTICAL MODULATION DEVICE AND OPTICAL MODULATION METHOD

(71) Applicant: Fujitsu Optical Components Limited, Kawasaki-shi, Kanagawa (JP)

(72) Inventors: Akihiro Toya, Kawasaki (JP); Tsuyoshi Morishita, Sappora (JP)

(73) Assignee: Fujitsu Optical Components Limited, Kawasaki (JP)

( * ) Notice: Subject to any disclaimer, the term of this patent is extended or adjusted under 35 U.S.C. 154(b) by 232 days.

(21) Appl. No.: 13/663,758

(22) Filed: Oct. 30, 2012

(65) Prior Publication Data

US 2013/0155482 A1 Jun. 20, 2013

(30) Foreign Application Priority Data

Dec. 16, 2011 (JP) .................................. 2011-276387

(51) Int. Cl.
*G02F 1/01* (2006.01)
*H04B 10/50* (2013.01)
*H04B 10/556* (2013.01)

(52) U.S. Cl.
CPC ................ *G02F 1/01* (2013.01); *G02F 1/0123* (2013.01); *H04B 10/50572* (2013.01); *H04B 10/50575* (2013.01); *H04B 10/50577* (2013.01); *H04B 10/5561* (2013.01)

(58) Field of Classification Search
USPC ......... 359/245, 237, 238, 239, 276, 279, 278, 359/247; 398/183, 185, 186, 187, 188, 192, 398/193, 194, 195, 196, 197, 198, 200, 201, 398/158, 159, 160, 135, 136
See application file for complete search history.

(56) References Cited

U.S. PATENT DOCUMENTS

2008/0080872 A1* 4/2008 Tanaka et al. .................. 398/186
2010/0021182 A1* 1/2010 Asano et al. .................... 398/188

FOREIGN PATENT DOCUMENTS

JP 2008-092172 4/2008

* cited by examiner

*Primary Examiner* — James Greece
*Assistant Examiner* — Sharrief Broome
(74) *Attorney, Agent, or Firm* — Staas & Halsey LLP

(57) ABSTRACT

In an optical modulation device, a first drive signal and a first bias signal are applied to a phase modulation unit, a second drive signal and a second bias signal are applied to a phase modulation unit, and a third bias signal is applied to a π/2 phase shift unit. A control unit adjusts the third bias signal in a first adjustment period, adjusts the first drive signal and the first bias signal in a second adjustment period next to the first adjustment period, and adjusts the second drive signal and the second bias signal in a third adjustment period next to the second adjustment period. The control unit starts the second adjustment period before a gap between the current value of an adjustment reference signal and a target value is filled, and starts the third adjustment period before a gap in the second adjustment period is filled.

7 Claims, 20 Drawing Sheets

400; # OPTICAL MODULATION DEVICE AND OPTICAL MODULATION METHOD

CROSS-REFERENCE TO RELATED APPLICATION

This application is based upon and claims the benefit of priority of the prior Japanese Patent Application No. 2011-276387, filed on Dec. 16, 2011, the entire contents of which are incorporated herein by reference.

FIELD

The embodiments discussed herein are directed to a light modulation device and a light modulation method.

BACKGROUND

Recently, in a backbone DWDM (Dense Wavelength Division Multiplex) optical communication system, a relay optical amplifier is used on an optical transmission line. Due to limitations of the transient response characteristics of the optical amplifier, it is generally preferable that an optical transmitter as an optical input source to the optical amplifier has a specification to gradually increase an optical output at the time of activation over a certain period of time.

FIG. 1 is a diagram illustrating an example of an optical output rise specification requested for an optical transmitter.

As illustrated in the upper part of FIG. 1, when a setting signal for an optical source of the optical transmitter is changed from "OFF" to "ON," as illustrated in the lower part of FIG. 1, in an optical output equal to or greater than Pmin, the optical output gradually rises at a slope (0 to 1 mW/sec) within a specification range. Here, in the case of an optical output equal to or less than Pmin, an optical amplifier on a transmission line is not activated, and therefore control may be not done in the case of an optical output equal to or less than Pmin. In the case of an optical output greater than Pmin, the optical amplifier starts to be activated, and therefore it is controlled such that the light output gradually increases.

FIG. 2 is a diagram for explaining content of control performed while an optical output gradually increases.

In the related art, by controlling an injection current to an LD (Laser Diode) of an optical transmitter and linearly increasing an LD optical output to, for example, a defined value over a certain period of time, a slope of the optical output rise is made gentle. Also, for example, as illustrated in Japanese Laid-open Patent Publication No. 2008-092172, in a case where an optical transmitter is configured with an LD and a phase modulator, a bias voltage or amplitude of an electric signal to drive the phase modulator is controlled (i.e. ABC (Auto Bias Control) control) to an optimum value. The control starts when an optical input (i.e. LD optical output) to the phase modulator reaches Pmin. Here, in the ABC control, pilot frequency of the lower frequency is superimposed over an optical signal and the control is performed based on a detection value of this component.

In a case where the phase modulator is configured with a plurality of stages, the ABC control of each stage is performed in a general time-sharing manner. Here, ABC control in the case of a DP-QPSK (Dual Polarization Quadrature Phase Shift Keying) modulation system will be described. In the case of performing ABC control of the multiple stages in a time-sharing manner, for example, as illustrated in FIG. 2, six adjustment periods corresponding to intervals I to VI are set. In FIG. 2, a time interval of twelve seconds is divided into six adjustment periods and different ABC control is performed on each adjustment period. Subsequently, these six adjustment periods are repeatedly set until an LD optical output reaches a defined value. That is, control supporting the six adjustment periods is repeatedly performed.

To be more specific, in interval I, bias control of π/2 shift on an X-side QPSK modulator is performed. In interval II, control on the modulation amplitude of an I signal and bias control on the I signal are performed in the X-side QPSK modulator. In interval III, control on the modulation amplitude of a Q signal and bias control on the Q signal are performed in the X-side QPSK modulator. In interval IV, bias control of π/2 shift on a Y-side QPSK modulator is performed. In interval V, control on the modulation amplitude of an I signal and bias control on the signal are performed in the Y-side QPSK modulator. In interval VI, control on the modulation amplitude of a Q signal and bias control on the Q signal are performed in the Y-side QPSK modulator. Here, as an example, each adjustment period is two seconds.

Also, in the bias control and the amplitude control in intervals II, III, V and VI, two different kinds of pilot frequencies are used. To be more specific, two kinds of pilot frequencies superimposed over optical signals are detected, and the bias control and the amplitude control are performed based on the detected values.

Thus, in the related art, control of a drive signal amplitude, DC bias and phase shifter is performed in a DQPSK/QPSK optical phase modulator.

Meanwhile, in ABC control in a phase modulator in the related art, the following variation occurs immediately after the start of control (especially control of a bias voltage and amplitude).

a) The ABC control largely moves toward a convergence point (i.e. optimum point) and therefore an optical power loss in the phase modulator largely varies.

b) The phase modulator and its drive circuit are generally mounted in neighbor positions because of high frequency characteristics. Therefore, when an output amplitude of the drive circuit increases, power consumption of the drive circuit increases and heat generation increases, and temperature increase is caused in the phase modulator due to this heat generation. Due to this influence, light transmission characteristics (i.e. applied voltage vs. optical power loss) of the phase modulator shift in a short period of time, and therefore an optical power loss in the phase modulator largely varies in an interval in which bias control is not performed (i.e. an interval in which a voltage is held).

FIG. 3 and FIG. 4 are diagrams for explaining a phenomenon where, when ABC control largely moves toward a convergence point (i.e. optimum point), an optical power loss largely varies in the phase modulator.

FIG. 3 is a graph in which the horizontal axis represents an applied voltage of the phase modulator (i.e. a modulation voltage applied to a modulation electrode of the phase modulator, which can be referred to as "drive voltage") and the vertical axis represents an optical power loss of the phase modulator (i.e. an optical output of the optical transmitter). The modulation voltage or the drive voltage is controlled by a modulation amplitude at which a voltage for modulation changes and a bias voltage which is the main voltage of the change.

Here, the optical power loss of the phase modulator (i.e. an optical output of the optical transmitter) represents changes in the optical output at the time of a change of the applied voltage held by the phase modulator in a case where an LD optical output is maximum.

FIG. 3 illustrates an optical power loss characteristic of the phase modulator with a sine curve characteristic and further illustrates a state of an applied voltage below the horizontal axis. The central point of the amplitude of an applied voltage is referred to as "bias point." The bias point may largely vary depending on ABC control. In FIG. 3, the bias point is represented by black circles. In the case of the phase modulator, the optimum position of the bias point is a point at which the optical output is minimum.

In FIG. 3, when an applied potential moves from 1 to 2, the optical output is indicated by 3 when the applied voltage is 1, and the optical output is indicated by 4 when the applied voltage is 2. As seen from comparison between the optical outputs 3 and 4, the optical output power loss (i.e. optical output) largely varies.

FIG. 4 is a graph where the horizontal axis represents an applied voltage of the phase modulator and the vertical axis represents an optical power loss of the phase modulator (i.e. an optical output of the optical transmitter). FIG. 4 illustrates a case where the applied voltage is originally 1 and the amplitude of the applied voltage rapidly increases by ABC control as illustrated in 2. The optical output is 3 when the applied voltage is 1, and the optical output is 4 when the applied voltage is 2. As seen from comparison between the optical outputs 3 and 4, the optical output largely varies.

FIG. 5 is a diagram for explaining a phenomenon where an optical power loss in the phase modulator largely varies when light transmission characteristics of the phase modulator shift by temperature increase. FIG. 5 is a graph where the vertical axis represents an applied voltage of the phase modulator and the vertical axis represents an optical power loss of the phase modulator (i.e. an optical output of the optical transmitter). In FIG. 5, light transmission characteristics of the phase modulator as illustrated by a sine curve shift to the right side by rapid temperature increase. Although the applied voltage does not vary, it is found that the optical output varies from 1 to 2.

FIG. 6 is a diagram for explaining a problem in the related art.

As a result of above (a) and (b), a case occurs where the optical output rise slope of the optical transmitter becomes rapid or negative as illustrated in FIG. 6, and therefore the optical output does not rise at a slope within a specification range. Here, FIG. 6 is a pattern diagram and does not definitely illustrate that the slope becomes rapid or negative in intervals II, III, V and VI as illustrated in FIG. 6. However, by performing ABC control in intervals I to VI, there can occur a case where, in any of these intervals, the optical output becomes rapid or negative.

With this phenomenon, the optical input level with respect to an optical amplifier, which is set as a repeater on a transmission line of a DWDM optical communication system, changes rapidly or increases and decreases (i.e. ringing). The response time of gain control (i.e. AGC or Automatic Gain Control) in the optical amplifier is slow, and therefore it is difficult to respond to the rapid change or ringing of this optical input level and the optical output level from the optical amplifier transiently changes. The variation of this optical output level causes degradation of transmission quality.

FIG. 7 is a diagram for explaining a state where transmission quality degradation is caused in the DWDM optical communication system.

It is assumed that the optical signals of respective wavelengths are output from optical transmitters 1 to N and a rapid change or ringing occurs in the optical output from the optical transmitter 1. The optical signals of respective wavelengths from the optical transmitters 1 to N are wavelength-multiplexed in an MUX 30 and transmitted. The wavelength-multiplexed optical signal wavelength-multiplexed in the MUX 30 is amplified as is in an optical amplifier 31. Here, since a rapid change or ringing occurs in the optical output from the optical transmitter 1, a rapid change or ringing occurs in the whole wavelength-multiplexed optical signal too. However, since the response time of AGC control in the optical amplifier 31 is slow, it is difficult to respond to the above, and the optical output from the optical amplifier 31 has a change different from the rapid change or ringing. If the respond is possible, the other optical signals of wavelengths than the optical signal of the wave length with the ringing are kept constant. However, since the respond is not possible, an optical output change also occurs in the other optical signals of wavelengths.

Therefore, such a wavelength-multiplexed optical signal is wavelength-demultiplexed in a DeMUX 32, and, when another group of optical transmitters 1 to N receive the results, an optical output change occurs in the optical signals of all wavelengths. This optical output change causes degradation of transmission quality on the receiving side.

SUMMARY

According to an aspect of an embodiment, an optical modulation device includes: a modulation unit that includes: a first modulation unit that forms a first optical modulation signal by modulating a light based on a first drive signal and a first bias signal; a second modulation unit that forms a second optical modulation signal by modulating a light based on a second drive signal and a second bias signal; and a phase shift unit that makes a phase difference between the first optical modulation signal and the second optical modulation signal closer to $\pi/2$ by shifting a phase of the first optical modulation signal with respect to the second optical modulation signal based on a third bias signal; a forming unit that forms an adjustment reference signal based on a synthesized signal synthesizing the first optical modulation signal phase-shifted in the phase shift unit and the second optical modulation signal; and a control unit that adjusts amplitudes of the first drive signal and the second drive signal and voltages of the first bias signal, the second bias signal and the third bias signal, based on a gap between a current value of the adjustment reference signal and a target value, wherein the control unit performs an adjustment in a plurality of adjustment periods and starts a second adjustment period next to a first adjustment period before the gap in the first adjustment period is filled.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Here, the optical modulation device and optical modulation method disclosed in the present application are not limited to these embodiments. Also, the identical codes are assigned to configurations having the identical function in the embodiments and overlapping explanation will be omitted.

[a] First Embodiment

Configuration of Optical Modulation Device 100

Figure 1:
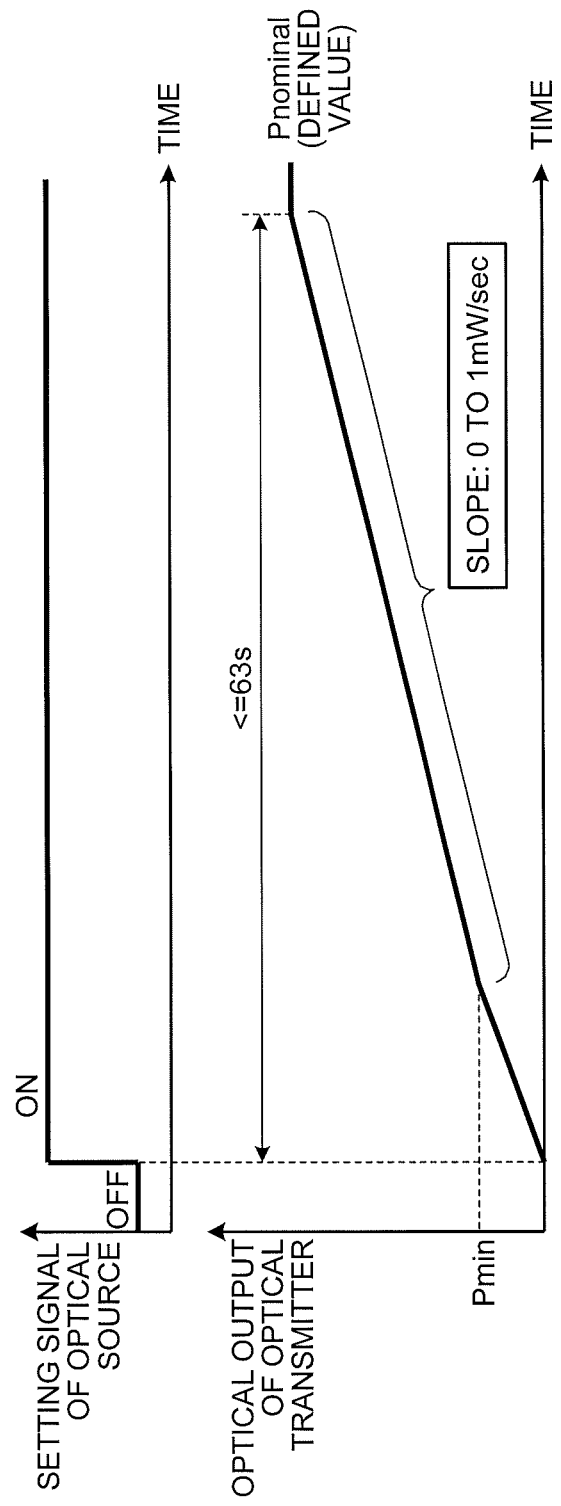
FIGS. 1A and 1B are diagrams illustrating an example of an optical output rise, based on a change in a setting signal, for an optical transmitter.
Figure 2:
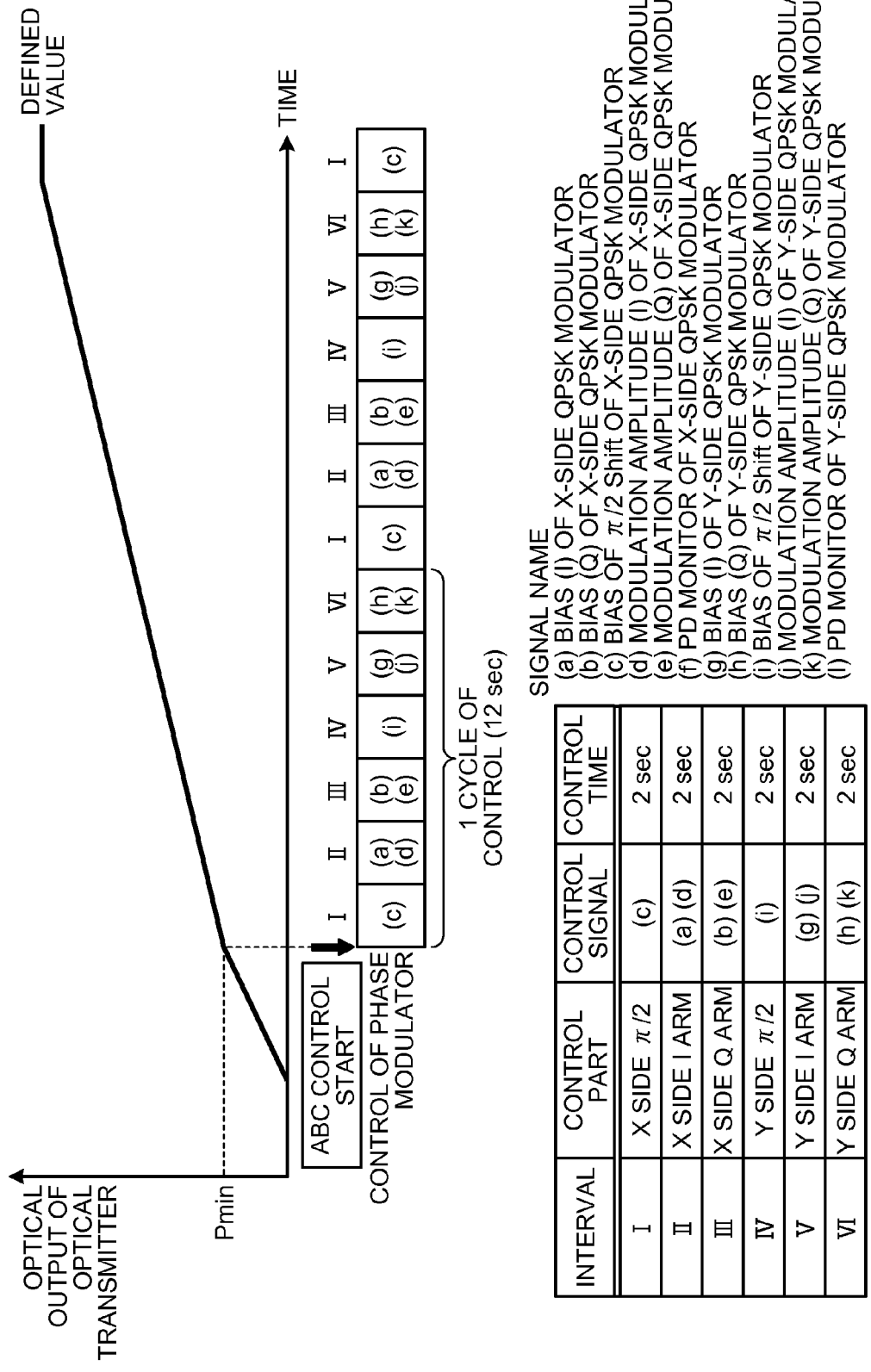
FIG. 2 is a diagram for explaining content of control performed while an optical output gradually increases.
Figure 3:
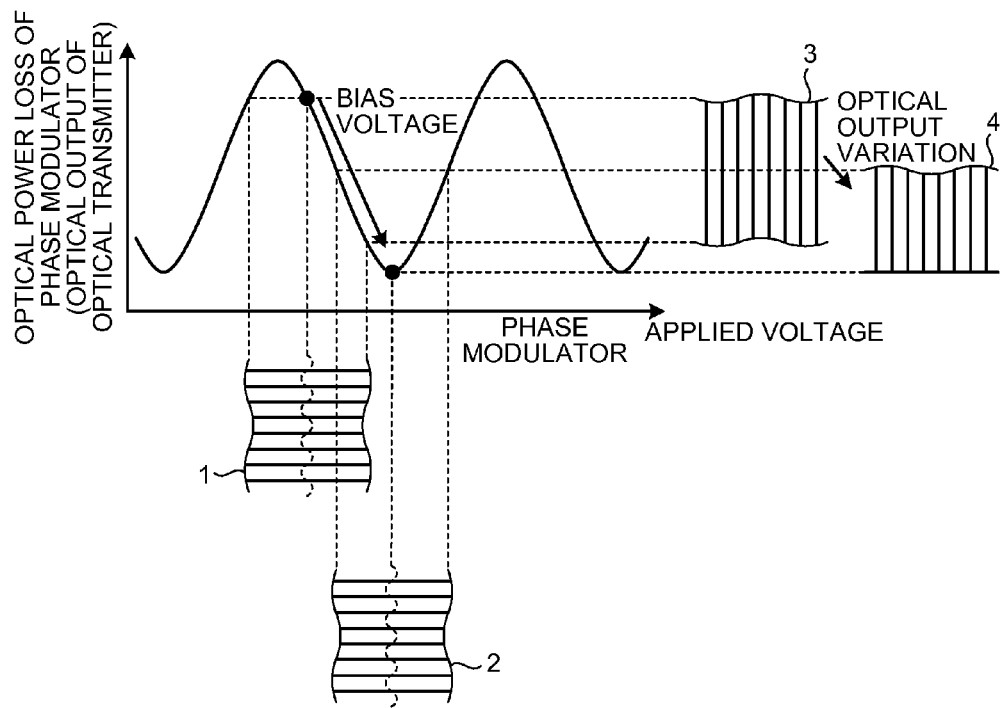
FIG. 3 is a diagram for explaining a phenomenon where an optical power loss in a phase modulator largely varies.
Figure 4:
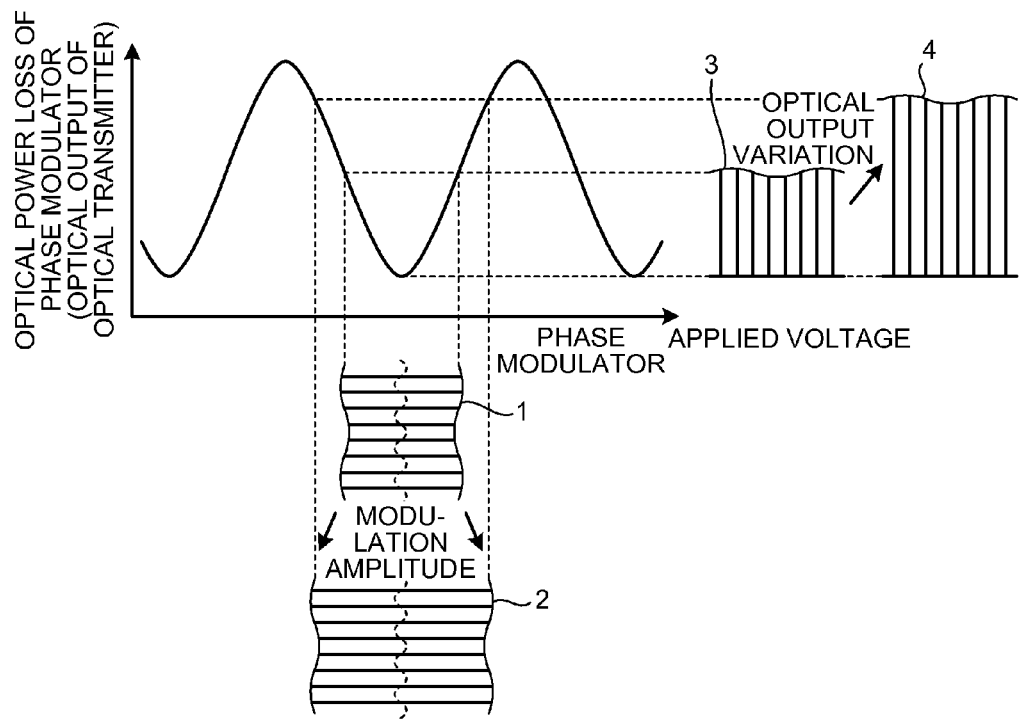
FIG. 4 is a diagram for explaining a phenomenon where an optical power loss in a phase modulator largely varies.
Figure 5:
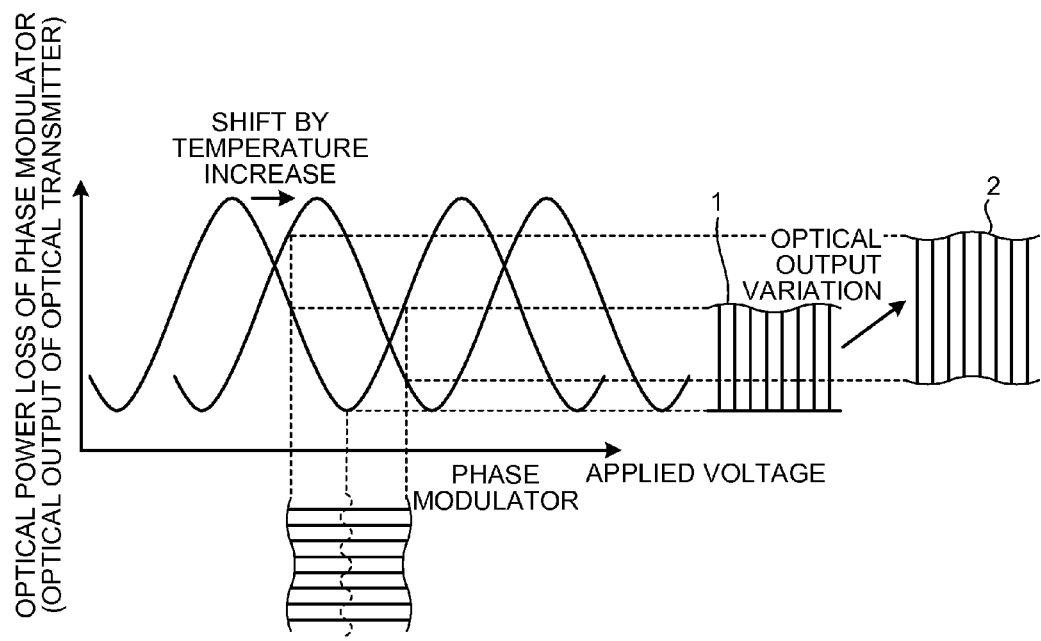
FIG. 5 is a diagram for explaining a phenomenon where an optical power loss in a phase modulator largely varies.
Figure 6:
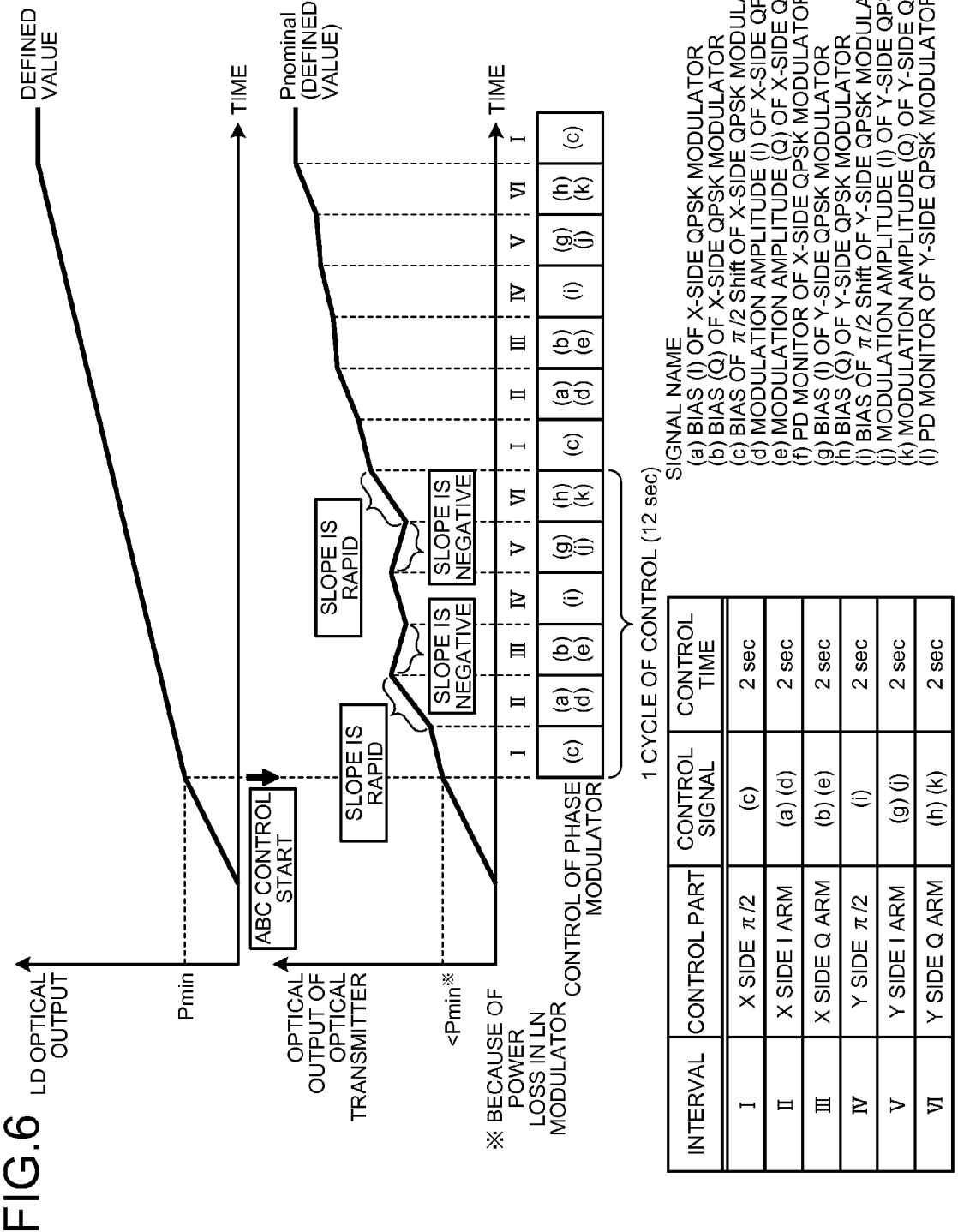
FIG. 6 is a diagram for explaining a problem in the related art.
Figure 7:
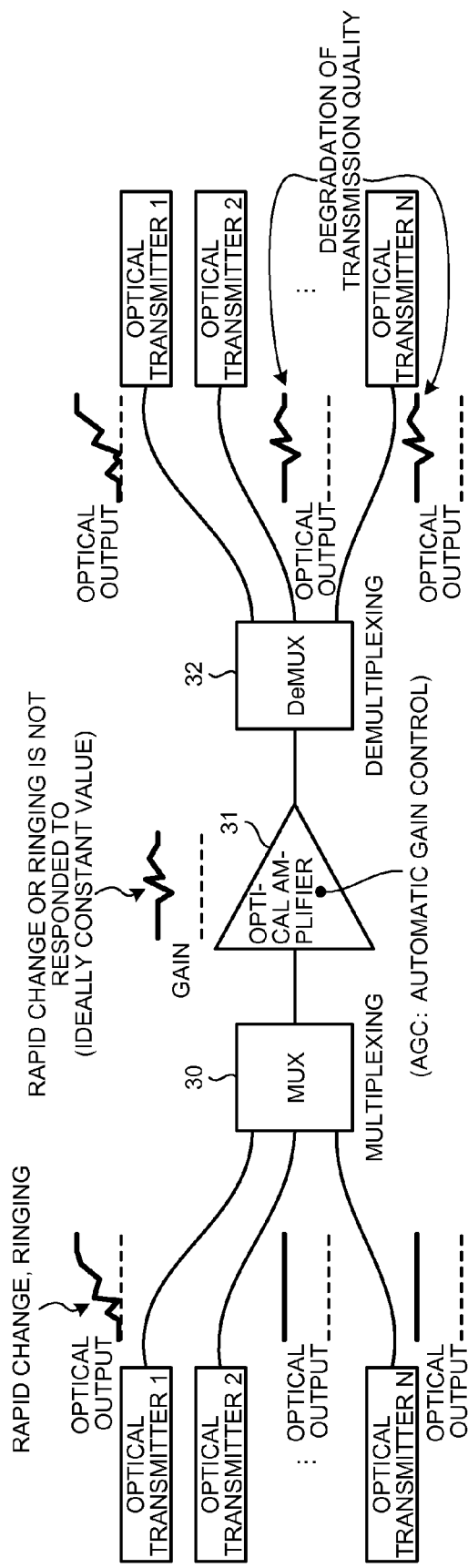
FIG. 7 is a diagram for explaining a state where transmission quality degradation is caused in a DWDM optical communication system.
Figure 8:
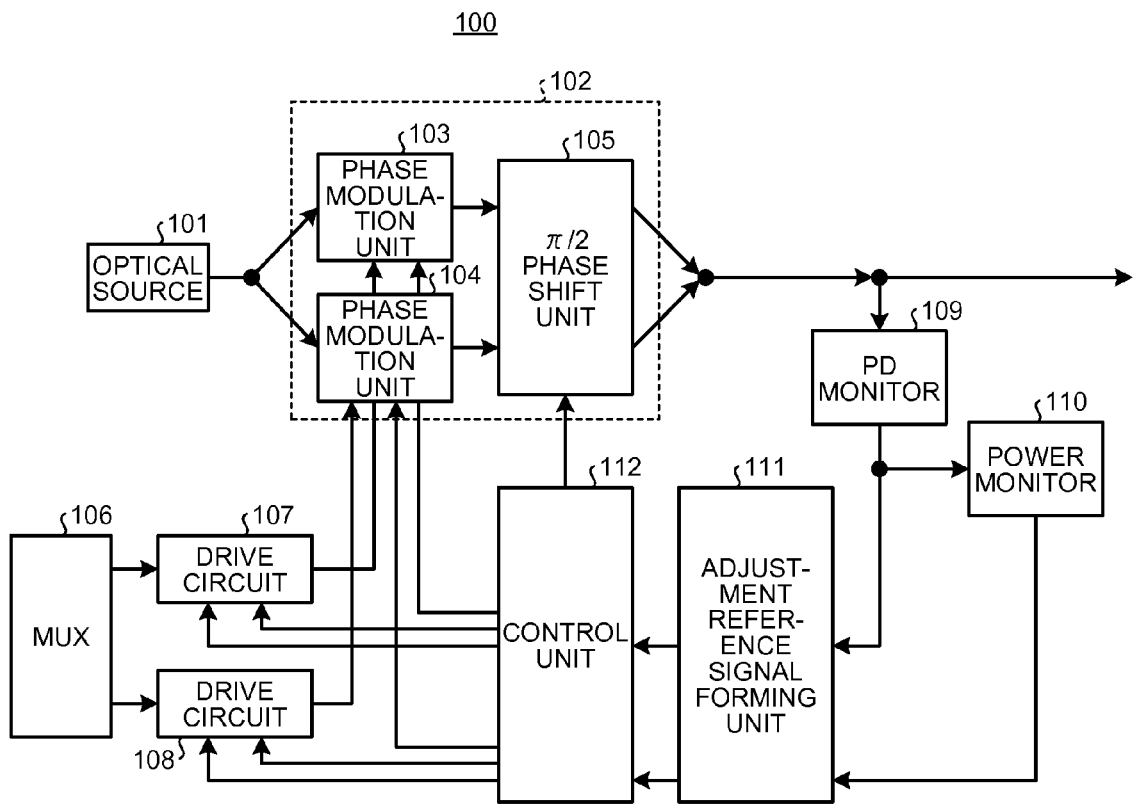
FIG. 8 is a block diagram illustrating a configuration example of an optical modulation device according to a first embodiment.

FIG. 8 is a block diagram illustrating a configuration example of the optical modulation device 100 according to a first embodiment. In FIG. 8, the optical modulation device 100 includes an optical source 101, a modulation unit 102, an MUX (multiplexer) 106, drive circuits 107 and 108, a PD (Photo Diode) monitor 109, a power monitor 110, an adjustment reference signal forming unit 111 and a control unit 112. Also, the modulation unit 102 includes phase modulation units 103 and 104 and a π/2 phase shift unit 105. The modulation unit 102 corresponds to, for example, an LN (LiNbO3) modulator of DQPSK (Differential Quadrature Phase Shift Keying) or DP-QPSK (Dual Polarization Quadrature Phase Shift Keying).

The optical source 101 generates and outputs continuous light to the modulation unit 102. The optical source 101 is, for example, an LD (Laser Diode). The light output from the optical source 101 is divided at a branch and input in the phase modulation unit 103 and the phase modulation unit 104.

The phase modulation unit 103 outputs a first optical modulation signal by modulating the input light based on a first drive signal output from the drive circuit 107 and a first bias signal output from the control unit 112. Here, the first drive signal is superimposed over a first pilot having a first frequency (f0). Also, the first bias signal is superimposed over a second pilot having a second frequency (f1).

To be more specific, the phase modulation unit 103 forms the first optical modulation signal by modulating the light based on the first drive signal and shifts the phase of the first optical modulation signal based on the first bias signal. Here, although the phase modulation unit 103 is explained as one function block, it is not limited to this and may be divided into two, that is, a modulation block and a phase shift block.

The phase modulation unit 104 outputs a second optical modulation signal by modulating the input light based on a second drive signal output from the drive circuit 108 and a second bias signal output from the control unit 112. Here, the second drive signal is superimposed over a first pilot having the first frequency (f0). Also, the second bias signal is superimposed over a second pilot having the second frequency (f1).

To be more specific, the phase modulation unit 104 forms the second optical modulation signal by modulating the light based on the second drive signal and shifts the phase of the second optical modulation signal based on the second bias signal. Here, although the phase modulation unit 104 is explained as one function block, it is not limited to this and may be divided into two, that is, a modulation block and a phase shift block.

For example, the phase modulation unit 103 forms an I-element modulation signal and the phase modulation unit 104 forms a Q-element modulation signal.

The π/2 phase shift unit 105 makes a phase difference between the first optical modulation signal and the second optical modulation signal closer to π/2 by shifting the phase of the first optical modulation signal with respect to the second optical modulation signal based on a third bias signal. Thus, the phase-shifted first optical modulation signal and the second optical modulation signal are synthesized in a coupler (not illustrated) and output to a subsequent stage as a synthesized signal. Here, the third bias signal is superimposed over a third pilot. In this case, as an example, a case will be explained where the third pilot has the second frequency (f1) similar to the second pilot.

The MUX 106 outputs parallel data signals to the drive circuit 107 and the drive circuit 108.

In the drive circuit 107, a driver voltage based on an amplitude control signal output from the control unit 112 is applied, and the drive circuit 107 forms the first drive signal by amplifying the input data signal to an amplitude based on the applied voltage, and outputs the first drive signal to the phase modulation unit 103. That is, the amplitude of the first drive signal is adjusted based on the amplitude control signal.

In the drive circuit 108, a driver voltage based on an amplitude control signal output from the control unit 112 is applied, and the drive circuit 108 forms the second drive signal by amplifying the input data signal to an amplitude based on the applied voltage, and outputs the second drive signal to the phase modulation unit 104. That is, the amplitude of the second drive signal is adjusted based on the amplitude control signal.

The PD monitor 109 detects an optical output of the optical modulation device 100 and converts the optical output into an electric signal.

The power monitor 110 detects the electric power of the electric signal output from the PD monitor 109. An electric power value detected in the power monitor 110 is a value based on the optical output.

The adjustment reference signal forming unit 111 forms an adjustment reference signal based on a synthesized signal. To be more specific, the adjustment reference signal forming unit 111 accepts inputs of the electric signal output from the PD monitor 109 and the electric value output from the power monitor 110. Subsequently, the adjustment reference signal forming unit 111 forms an adjustment reference signal based on the electric signal output from the PD monitor 109 and the electric value output from the power monitor 110, and outputs the adjustment reference signal to the control unit 112. Also, the adjustment reference signal forming unit 111 will be described later in detail.

The control unit 112 adjusts the amplitudes of the first drive signal and second drive signal, and the voltages of the first bias signal, second bias signal and third bias signal, based on a gap between the current value of the adjustment reference signal received from the adjustment reference signal forming unit 111 and a target value.

To be more specific, the control unit 112 adjusts the third bias signal in the first adjustment period. Also, the control unit 112 adjusts the first drive signal and the first bias signal in a second adjustment period next to the first adjustment period. Also, the control unit 112 adjusts the second drive signal and the second bias signal in a third adjustment period next to the second adjustment period.

Also, the control unit 112 controls the adjustment periods. To be more specific, the control unit 112 starts the second adjustment period before the gap between the current value of the adjustment reference signal and the target value is filled in the first adjustment period, and starts the third adjustment period before a gap in the second adjustment period is filled. Also, the control unit 112 will be described later in detail.

Figure 9:
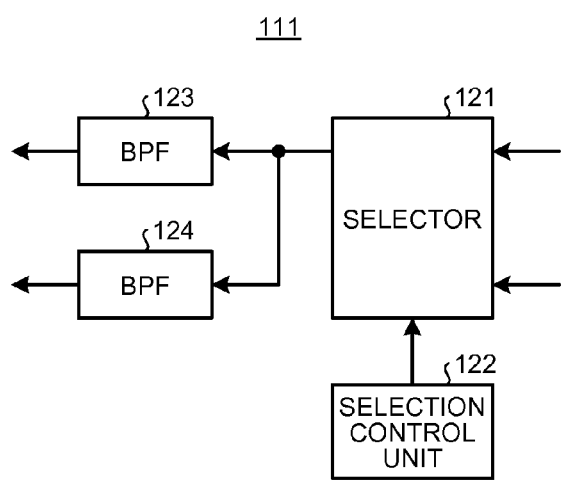
FIG. 9 is a block diagram illustrating a configuration example of an adjustment reference signal forming unit.

FIG. 9 is a block diagram illustrating a configuration example of the adjustment reference signal forming unit 111. In FIG. 9, the adjustment reference signal forming unit 111 includes a selector 121, a selection control unit 122 and band-pass filters (BPFs) 123 and 124.

The selection control unit 122 outputs a selection control signal based on an adjustment period to the selector 121. To be more specific, the selection control unit 122 outputs a first selection control signal in a period corresponding to the first adjustment period. This first selection control signal is a signal to instruct the selector 121 to select and output the electric power value output from the power monitor 110, among the electric power signal output from the PD monitor 109 and the electric power value output from the power monitor 110. Also, the selection control unit 122 outputs a second selection control signal in periods corresponding to the second adjustment period and the third adjustment period. This second selection control signal is a signal to instruct the selector 121 to select and output the electric signal output from the PD monitor 109, among the electric power signal output from the PD monitor 109 and the electric power value output from the power monitor 110.

The selector 121 selects an input signal according to a selection control signal received from the selection control unit 122 and outputs the input signal to the BPF 123 and the BPF 124.

The BPF 123 extracts a signal element corresponding to the second frequency (f1) from the output signal of the selector 121 and outputs the signal element to the control unit 112.

The BPF 124 extracts a signal element corresponding to the first frequency (f0) from the output signal of the selector 121 and outputs the signal element to the control unit 112.

Figure 10:
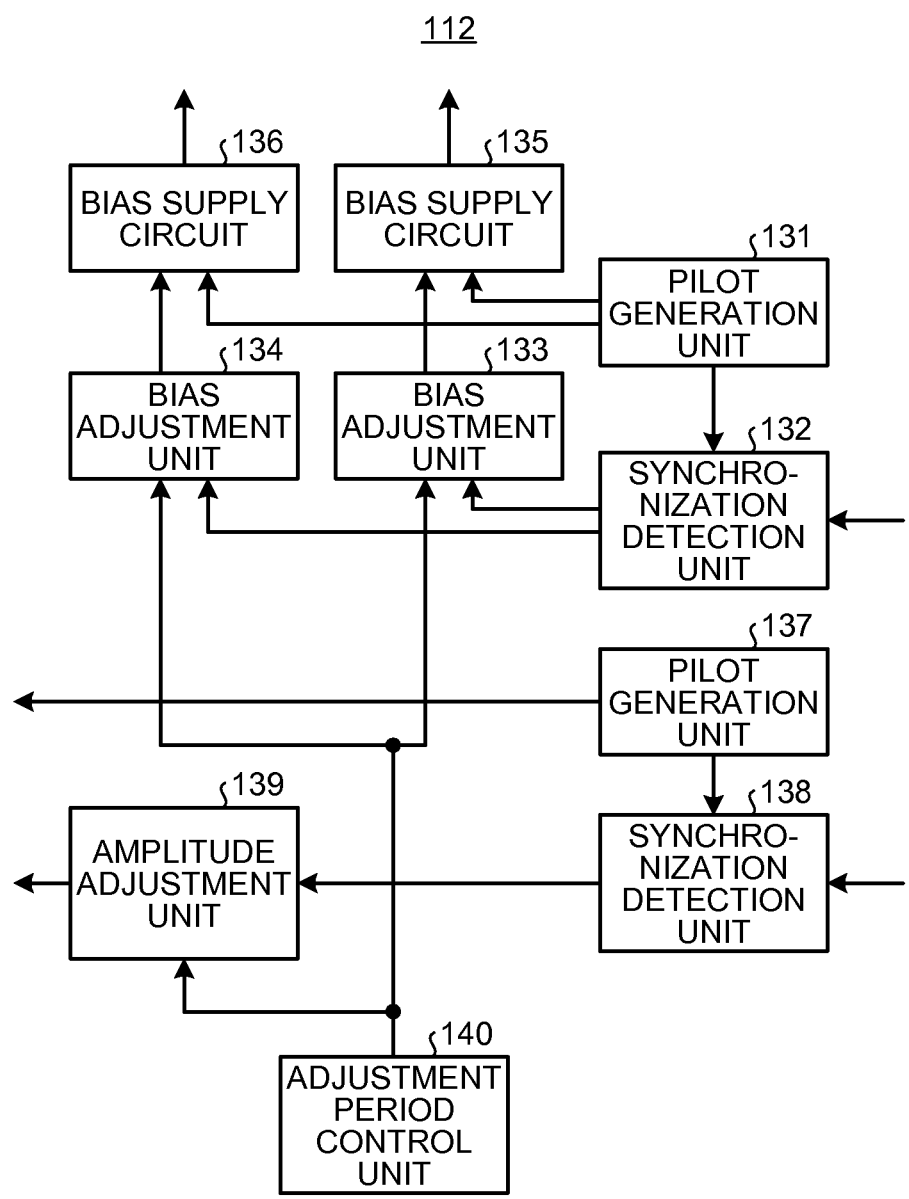
FIG. 10 is a block diagram illustrating a configuration example of a control unit.

FIG. 10 is a block diagram illustrating a configuration example of the control unit 112. In FIG. 10, the control unit 112 includes pilot generation units 131 and 137, synchronization detection units 132 and 138, bias adjustment units 133 and 134, bias supply circuits 135 and 136, an amplitude adjustment unit 139 and an adjustment period control unit 140.

The pilot generation unit 131 generates the second pilot having the second frequency (f1) and outputs it to the synchronization detection unit 132, the bias supply circuit 135 and the bias supply circuit 136.

The synchronization detection unit 132 detects an element having the second frequency (f1) from the signal output from the BPF 123. This detection result represents a gap between the current value of an adjustment reference signal (i.e. the element having the second frequency (f1) in this case) and a target value, and becomes minimum when the first bias signal, the second bias signal and the third bias signal are optimally adjusted.

This detection result is output to the bias adjustment unit 133 and the bias adjustment unit 134.

The bias adjustment unit 133 generates a bias adjustment signal to adjust the third bias signal based on the detection result, in the first adjustment period, and outputs the bias adjustment signal to the bias supply circuit 135.

The bias supply circuit 135 generates the third bias signal based on the bias adjustment signal received from the bias adjustment unit 133 in the first adjustment period, superimposes the pilot generated in the pilot generation unit 131 over the generated third bias signal and outputs the result to the π/2 phase shift unit 105.

The bias adjustment unit 134 generates a bias adjustment signal to adjust the first bias signal based on the detection result, in the second adjustment period, and outputs the bias adjustment signal to the bias supply circuit 136. Also, the bias adjustment unit 134 generates a bias adjustment signal to adjust the second bias signal based on the detection result, in the third adjustment period, and outputs the bias adjustment signal to the bias supply circuit 136.

The bias supply circuit 136 generates the first bias signal based on the bias adjustment signal received from the bias adjustment unit 134 in the second adjustment period, superimposes the pilot generated in the pilot generation unit 131 over the generated first bias signal and outputs the result to the phase modulation unit 103. Also, the bias supply circuit 136 generates the second bias signal based on the bias adjustment signal received from the bias adjustment unit 134 in the third adjustment period, superimposes the pilot generated in the pilot generation unit 131 over the generated second bias signal and outputs the result to the phase modulation unit 104.

The pilot generation unit 137 generates and outputs the first pilot having the first frequency (f0) to the synchronization detection unit 138, the drive circuit 107 and the drive circuit 108.

The synchronization detection unit 138 detects an element having the first frequency (f0) from the signal output from the BPF 124. This detection result represents a gap between the current value of an adjustment reference signal (i.e. the element having the first frequency (f0) in this case) and a target value, and becomes minimum when the first drive signal or the second drive signal are optimally adjusted. This detection result is output to the amplitude adjustment unit 139.

The amplitude adjustment unit 139 generates an amplitude control signal to adjust the first drive signal based on the detection result, in the second adjustment period, and outputs the amplitude control signal to the drive circuit 107. Also, the amplitude adjustment unit 139 generates an amplitude control signal to adjust the second drive signal based on the detection result, in the third adjustment period, and outputs the amplitude control signal to the drive circuit 108.

The adjustment period control unit 140 controls the adjustment periods. To be more specific, the control unit 112 starts the second adjustment period before the gap between the current value of the adjustment reference signal and the target value is filled in the first adjustment period, and starts the third adjustment period before a gap in the second adjustment period is filled.

To be more specific, the adjustment period control unit 140 controls a length of the first adjustment period to be equal to or greater than one cycle of the third pilot and equal to or less than the time constant at the time of adjustment of the third bias signal. Also, the adjustment period control unit 140 controls a length of the second adjustment period to be equal to or greater than one cycle of the first pilot and equal to or less than the time constant at the time of adjustment of the first drive signal and the first bias signal. Further, the adjustment period control unit 140 controls a length of the third adjustment period to be equal to or greater than one cycle of the second pilot and equal to or less than the time constant at the time of adjustment of the second drive signal and the second bias signal.

Operations of Optical Modulation Device 100

Figure 11:
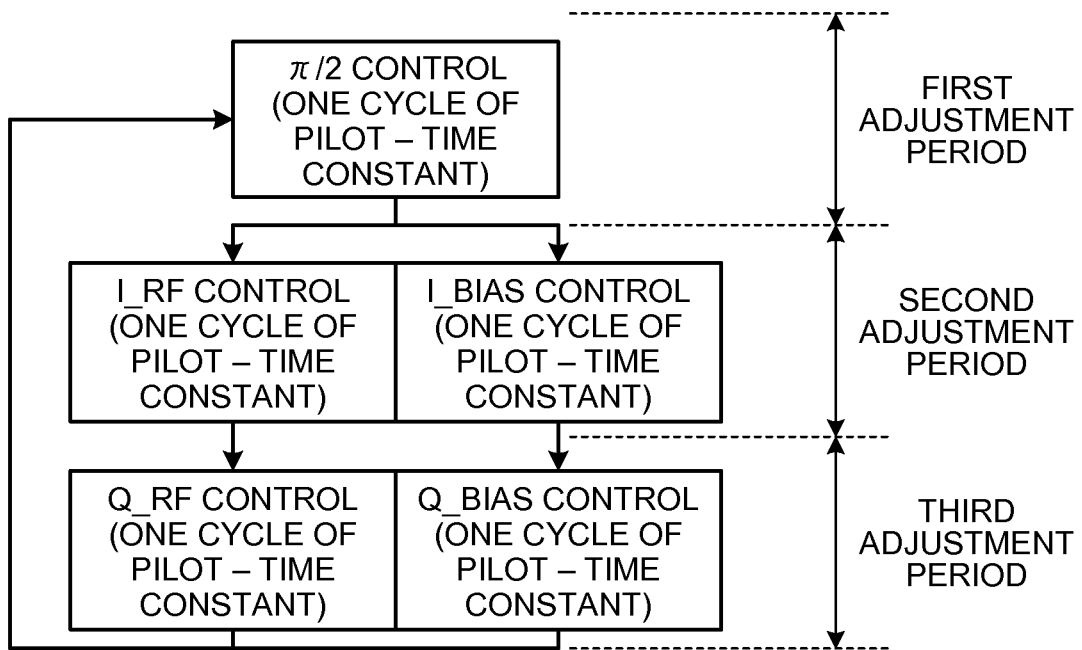
FIG. 11 is a diagram provided for illustrating operations of an optical modulation device according to the first embodiment.

Operations of the optical modulation device 100 having the above configuration will be explained. FIG. 11 is a diagram provided for illustrating the operations of the optical modulation device 100.

In the first adjustment period, the control unit 112 performs adjustment of the third bias signal, that is, performs adjustment in the π/2 phase shift unit 105. The length of the first adjustment period is equal to or greater than one cycle of the third pilot and equal to or less than the time constant at the time of adjustment of the third bias signal. That is, the first adjustment period is finished before the gap between the current value of the adjustment reference signal and the target value in the first adjustment period is filled. By this means, it is possible to shorten the first adjustment period.

In the second adjustment period subsequent to the first adjustment period, the control unit 112 performs adjustment of the first drive signal and the first bias signal, that is, performs adjustment in the phase modulation unit 103. The control unit 112 starts the second adjustment period before the gap between the current value of the adjustment reference signal and the target value in the first adjustment period is filled. That is, the second adjustment period starts before control of the first adjustment period is completed. By this means, it is possible to reduce the loss variation (i.e. the above ringing) of the optical modulation device 100 due to the adjustment in the first adjustment period.

The length of the second adjustment period is equal to or greater than one cycle of the first pilot and equal to or less than the time constant at the time of adjustment of the first drive signal and the first bias signal. By this means, it is possible to shorten the second adjustment period.

In the third adjustment period subsequent to the second adjustment period, the control unit 112 performs adjustment of the second drive signal and the second bias signal, that is, performs adjustment in the phase modulation unit 104. The control unit 112 starts the third adjustment period before the gap between the current value of the adjustment reference signal and the target value in the second adjustment period is filled. That is, the third adjustment period starts before control of the second adjustment period is completed. By this means, it is possible to reduce the loss variation (i.e. the above ringing) of the optical modulation device 100 due to the adjustment in the second adjustment period.

The length of the third adjustment period is equal to or greater than one cycle of the second pilot and equal to or less than the time constant at the time of adjustment of the second drive signal and the second bias signal. By this means, it is possible to shorten the third adjustment period.

Figure 12:
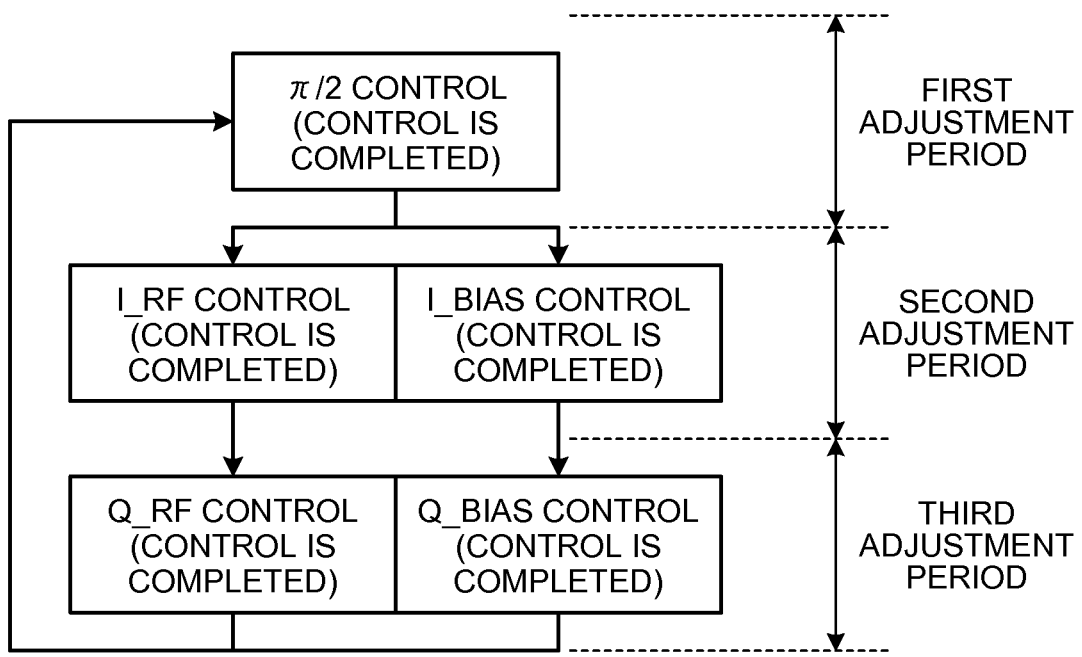
FIG. 12 is a diagram provided for explaining ABC control in the related art.

By contrast with this, as illustrated in FIG. 12, in a case where each adjustment period is finished after the gap between the current value of the adjustment reference signal and the target value is filled, the loss variation (i.e. the above ringing) of the optical modulation device 100 due to the adjustment in each adjustment period appears significantly.

As described above, according to the present embodiment, in the optical modulation device 100, the control unit 112 starts the second adjustment period before the gap between the current value of the adjustment reference signal and the target value is filled in the first adjustment period, and starts the third adjustment period before the gap in the second adjustment period is filled.

By this means, it is possible to reduce the loss variation (i.e. the above ringing) of the optical modulation device 100 in the current adjustment period due to adjustment in the previous adjustment period.

To be more specific, the control unit 112 controls the length of the first adjustment period to be equal to or greater than one cycle of the third pilot and equal to or less than the time constant at the time of adjustment of the third bias signal. Also, the control unit 112 controls the length of the second adjustment period to be equal to or greater than one cycle of the first pilot and equal to or less than the time constant at the time of adjustment of the first drive signal and the first bias signal. Further, the control unit 112 controls the length of the third adjustment period to be equal to or greater than one cycle of the second pilot and equal to or less than the time constant at the time of adjustment of the second drive signal and the second bias signal.

[b] Second Embodiment

A second embodiment relates to an optical modulation device having a plurality of modulation units.

Configuration of Optical Modulation Device 200

Figure 13:
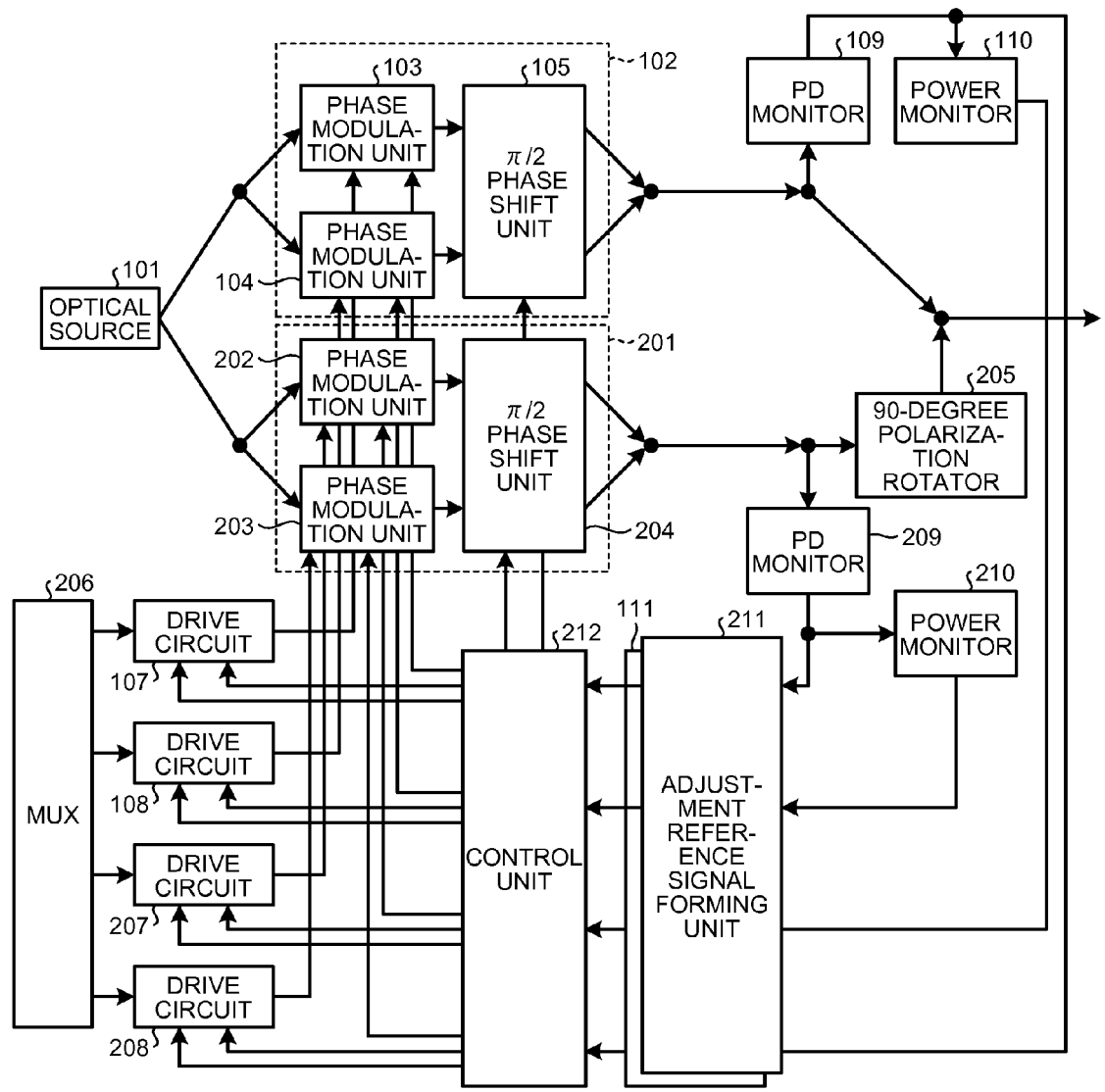
FIG. 13 is a block diagram illustrating a configuration example of an optical modulation device according to a second embodiment.

FIG. 13 is a block diagram illustrating a configuration example of the optical modulation device 200 according to the second embodiment. In FIG. 13, the optical modulation device 200 includes a modulation unit 201, a 90-degree polarization rotator 205, an MUX 206, a drive circuit 207, a drive circuit 208, a PD monitor 209, a power monitor 210, an adjustment reference signal forming unit 211 and a control unit 212. The modulation unit 201 includes a phase modulation unit 202, a phase modulation unit 203 and a π/2 phase shift unit 204. The modulation unit 102 and the modulation unit 201 correspond to, for example, an LN (LiNbO3) modulator of DQPSK (Difference Quadrature Phase Shift Keying) or DP-QPSK (Dual Polarization Quadrature Phase Shift Keying). Also, for example, the modulation unit 102 forms a modulation signal transmitted by X polarized wave and the modulation unit 201 forms a modulation signal transmitted by Y polarized wave.

The phase modulation unit 202 outputs a third optical modulation signal by modulating the input light based on a third drive signal output from the drive circuit 207 and a fourth bias signal output from the control unit 112. Here, the third drive signal is superimposed over the first pilot having the first frequency (f0). Also, the fourth bias signal is superimposed over the second pilot having the second frequency (f1).

To be more specific, the phase modulation unit 202 forms the third optical modulation signal by modulating the light based on the third drive signal and shifts the phase of the third optical modulation signal based on the fourth bias signal. Here, although the phase modulation unit 202 is explained as one function block, it is not limited to this and may be divided into two, that is, a modulation block and a phase shift block.

The phase modulation unit 203 outputs a fourth optical modulation signal by modulating the input light based on a fourth drive signal output from the drive circuit 208 and a fifth bias signal output from the control unit 112. Here, the fourth drive signal is superimposed over the first pilot having the first frequency (f0). Also, the fifth bias signal is superimposed over the second pilot having the second frequency (f1).

To be more specific, the phase modulation unit 203 forms the fourth optical modulation signal by modulating the light based on the fourth drive signal and shifts the phase of the fourth optical modulation signal based on the fifth bias signal. Here, although the phase modulation unit 203 is explained as one function block, it is not limited to this and may be divided into two, that is, a modulation block and a phase shift block.

For example, the phase modulation unit 203 forms an I-element modulation signal transmitted by Y polarized wave and the phase modulation unit 104 forms a Q-element modulation signal transmitted by Y polarized wave.

The π/2 phase shift unit 204 makes a phase difference between the third optical modulation signal and the fourth optical modulation signal closer to π/2 by shifting the phase of the third optical modulation signal with respect to the fourth optical modulation signal based on a sixth bias signal. Thus, the phase-shifted third optical modulation signal and the fourth modulation signal are synthesized in a coupler (not illustrated) and output to a subsequent stage as a second synthesized signal. Here, the sixth bias signal is superimposed over the third pilot.

The 90-degree polarization rotator 205 rotates the polarized wave of the second synthesized signal by 90 degree with respect to the first synthesized signal corresponding to the modulation unit 102. The first synthesized signal and the second synthesized signal subjected to 90-degree polarization rotation are synthesized and output as a third synthesized signal from the optical modulation device 200.

The MUX 206 outputs parallel data signals to the drive circuit 107, the drive circuit 108, the drive circuit 207 and the drive circuit 208.

In the drive circuit 207, a driver voltage based on an amplitude control signal output from the control unit 112 is applied, and the drive circuit 207 forms the third drive signal by amplifying the input data signal to an amplitude based on the applied voltage, and outputs the third drive signal to the phase modulation unit 202. That is, the amplitude of the third drive signal is adjusted based on the amplitude control signal.

In the drive circuit 208, a driver voltage based on an amplitude control signal output from the control unit 112 is applied, and the drive circuit 208 forms the fourth drive signal by amplifying the input data signal to an amplitude based on the applied voltage, and outputs the fourth drive signal to the phase modulation unit 203. That is, the amplitude of the fourth drive signal is adjusted based on the amplitude control signal.

The PD monitor 209 detects the second synthesized signal and converts it into an electric signal.

The power monitor 210 detects the electric power of the electric signal output from the PD monitor 209. An electric power value detected in the power monitor 210 is a value based on the optical output.

The adjustment reference signal forming unit 211 forms an adjustment reference signal based on the second synthesized signal. To be more specific, the adjustment reference signal forming unit 211 accepts inputs of the electric signal output from the PD monitor 209 and the electric value output from the power monitor 210. Subsequently, the adjustment reference signal forming unit 211 forms an adjustment reference signal based on the electric signal output from the PD monitor 209 and the electric value output from the power monitor 210, and outputs the adjustment reference signal to the control unit 212. Thus, by providing the adjustment reference signal forming unit 111 and the adjustment reference signal forming unit 211 in parallel, it is possible to perform adjustment in the modulation unit 102 and adjustment in the modulation unit 201 in parallel.

The control unit 212 performs adjustment processing similar to that in the control unit 112 according to the first embodiment, on the modulation unit 102 and the modulation unit 201 in parallel.

Operations of Optical Modulation Device 200

Figure 14:
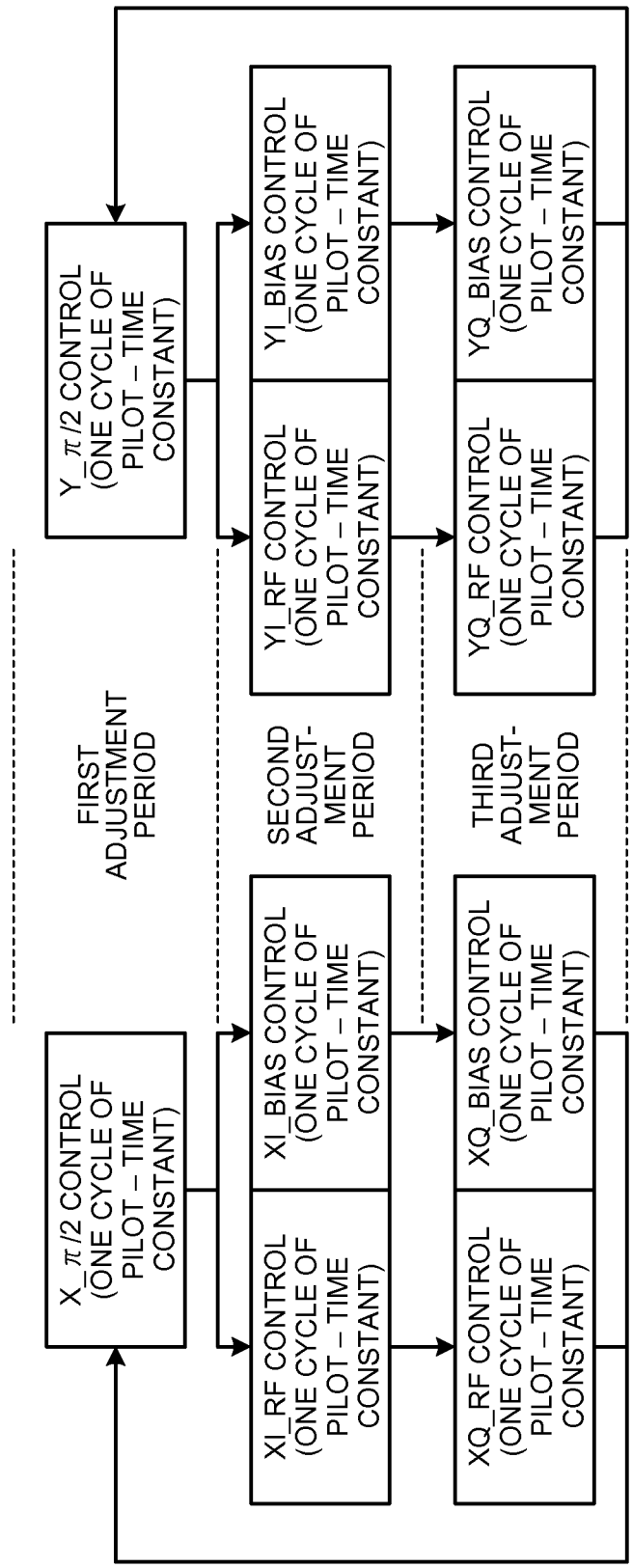
FIG. 14 is a diagram provided for explaining operations of an optical modulation device according to the second embodiment.

Operations of the optical modulation device 200 having the above configuration will be explained. FIG. 14 is a diagram provided for illustrating the operations of the optical modulation device 200.

In the first adjustment period, the control unit 112 performs adjustment of the third bias signal and adjustment of the sixth bias signal in parallel. That is, the control unit 112 performs adjustment in the π/2 phase shift unit 105 and adjustment in the π/2 phase shift unit 204 in parallel.

In the second adjustment period, the control unit 112 performs adjustment of the first drive signal and first bias signal and adjustment of the third drive signal and fourth bias signal in parallel. That is, the control unit 112 performs adjustment in the phase modulation unit 103 and adjustment in the phase modulation unit 202 in parallel.

In the third adjustment period, the control unit 112 performs adjustment of the second drive signal and second bias signal and adjustment of the fourth drive signal and fifth bias signal in parallel. That is, the control unit 112 performs adjustment in the phase modulation unit 103 and adjustment in the phase modulation unit 202 in parallel.

Figure 15:
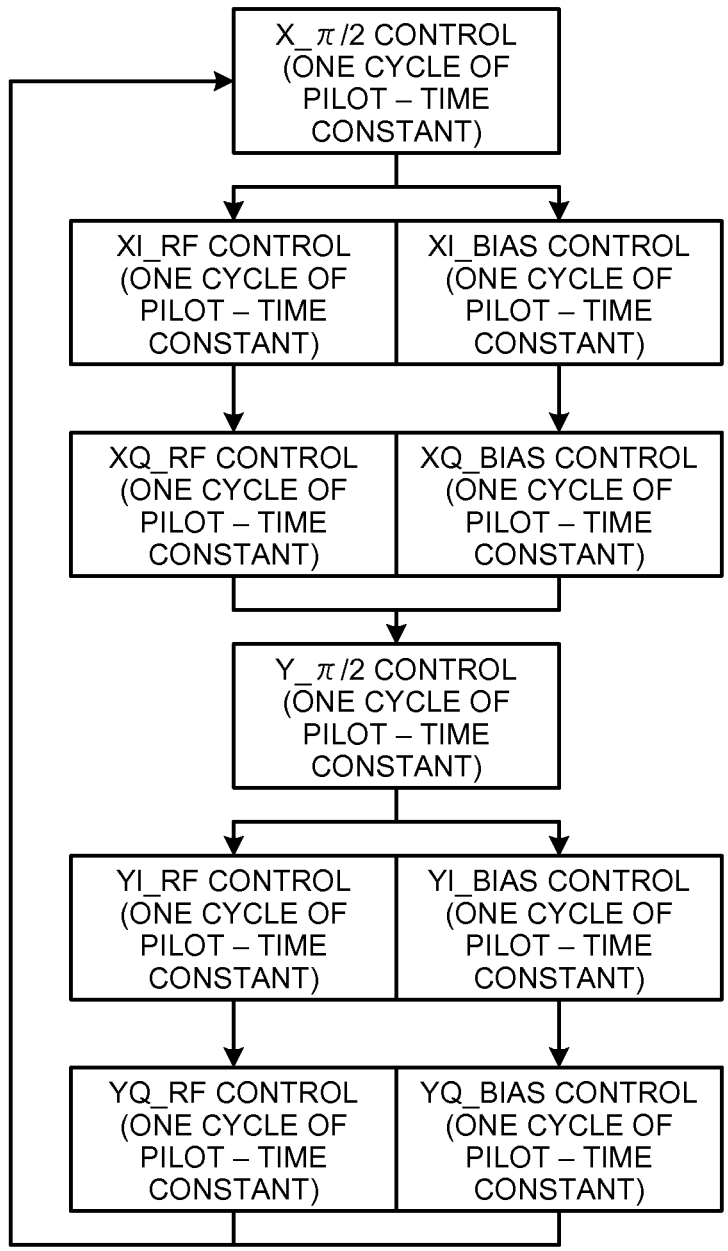
FIG. 15 is a diagram provided for explaining other ABC control methods.

By contrast with this, as illustrated in FIG. 15, it is possible to perform adjustment with respect to the modulation unit 102 and adjustment with respect to the modulation unit 201 in a time-sharing manner.

However, as illustrated in FIG. 14, by performing the adjustment with respect to the modulation unit 102 and the adjustment with respect to the modulation unit 201 in parallel, it is possible to shorten the time required for the whole ABC control in the optical modulation device 200.

As described above, according to the present embodiment, in the optical modulation device 200, the adjustment reference signal forming unit 111 and the adjustment reference signal forming unit 211 are set in parallel, and the control unit 112 performs adjustment with respect to the modulation unit 102 adjustment with respect to the modulation unit 201 in parallel.

By this means, it is possible to shorten the time required for the whole ABC control in the optical modulation device 200.

[c] Third Embodiment

In a third embodiment, adjustment with respect to a modulation unit starts before an optical source emits light. Accordingly, a limit is set for a drive signal and bias signal.

Configuration of Optical Modulation Device 300

Figure 16:
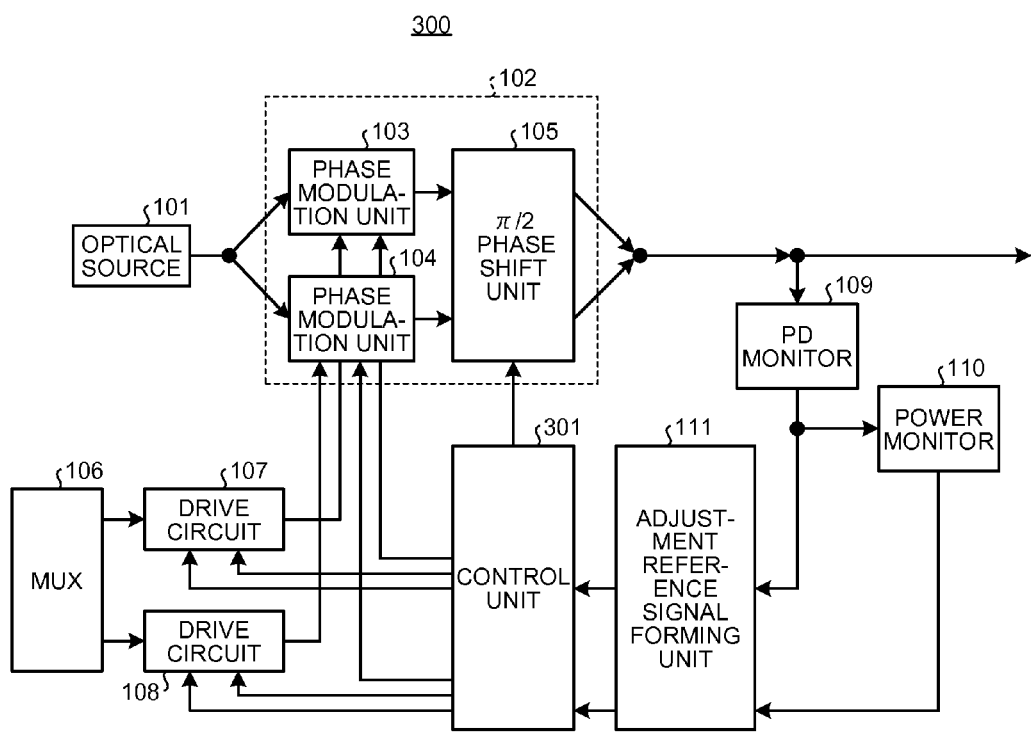
FIG. 16 is a block diagram illustrating a configuration example of an optical modulation device according to a third embodiment.
Figure 17:
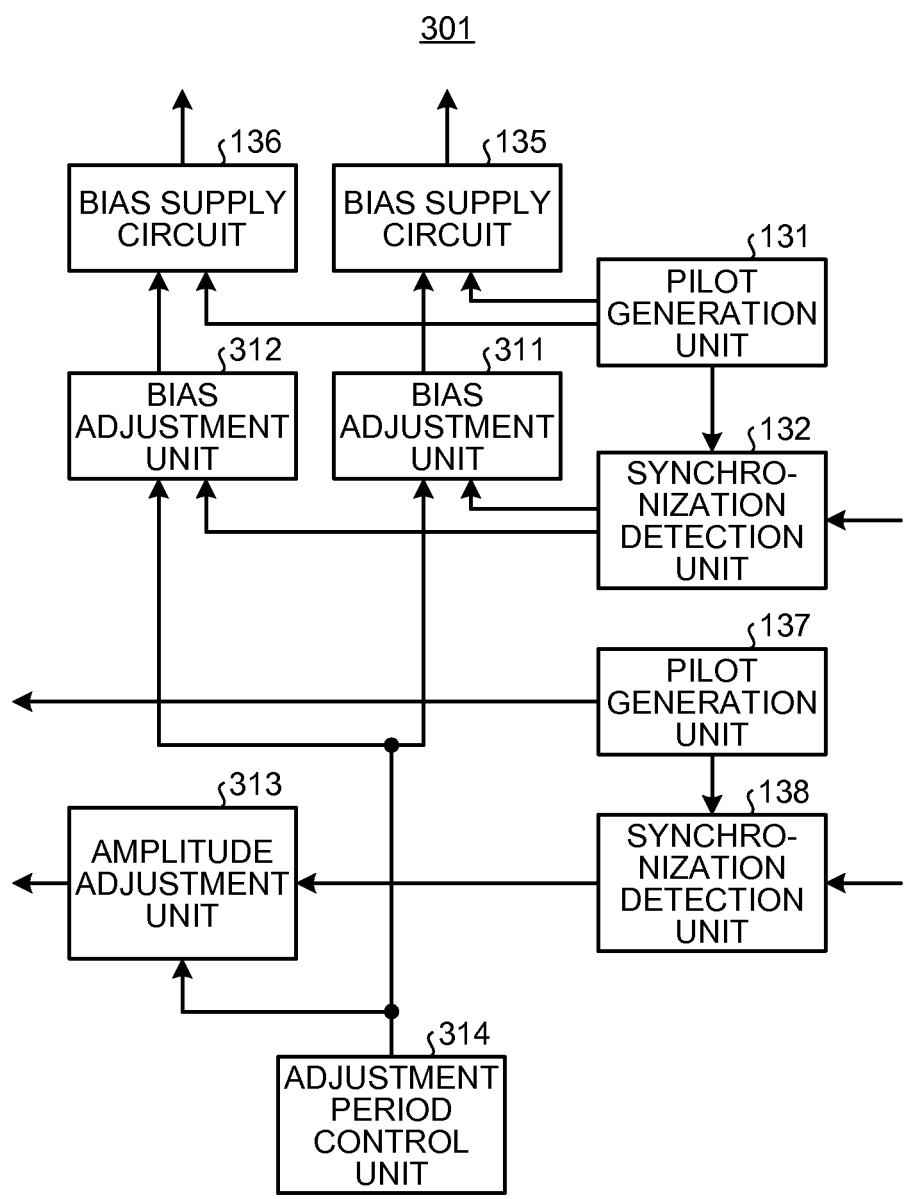
FIG. 17 is a block diagram illustrating a configuration example of a control unit.

FIG. 16 is a block diagram illustrating a configuration example of the optical modulation device 300 according to the third embodiment. In FIG. 16, the optical modulation device 300 includes a control unit 301. As illustrated in FIG. 17, the control unit 301 includes bias adjustment units 311 and 312, an amplitude adjustment unit 313 and an adjustment period control unit 314.

The control unit 301 controls the start timing of adjustment with respect to the modulation unit 102. To be more specific, the adjustment period control unit 314 of the control unit 301 starts a first adjustment timing before the optical source 101 emits light.

Also, the bias adjustment unit 311 of the control unit 301 sets an allowable range of a target voltage value of the third bias signal (hereinafter referred to as "first allowable range"). Subsequently, in a case where the target voltage value of the third bias signal in the first adjustment period is out of the first allowable range, the bias adjustment unit 311 changes the target voltage value of the third bias signal to a predetermined value in the first allowable range. Here, the predetermined value in the first allowable range is, for example, a zero value.

Also, the bias adjustment unit 312 of the control unit 301 sets an allowable range of target voltage values of the first bias signal and second bias signal (hereinafter referred to as "second allowable range"). Subsequently, in a case where the target voltage value of the first bias signal in the second adjustment period is out of the second allowable range, the bias adjustment unit 312 changes the target voltage value of the first bias signal to a predetermined value in the second allowable range. In a case where the target voltage value of the second bias signal in the third adjustment period is out of the second allowable range, the bias adjustment unit 312 changes the target voltage value of the second bias signal to a predetermined value in the second allowable range. Here, the predetermined value in the second allowable range is, for example, a zero value.

Also, the amplitude adjustment unit 313 of the control unit 301 sets an allowable range of target voltage values of the first drive signal and second drive signal (hereinafter referred to as "third allowable range"). Subsequently, in a case where the target voltage value of the first or second drive signal in the second or third adjustment period is out of the third allowable range, the amplitude adjustment unit 313 changes the target voltage value of the first or second drive signal to the minimum value in the third allowable range.

Operations of Optical Modulation Device 300

Operations of the optical modulation device 300 having the above configuration will be explained.

Adjustment of Third Bias Signal

Figure 18:
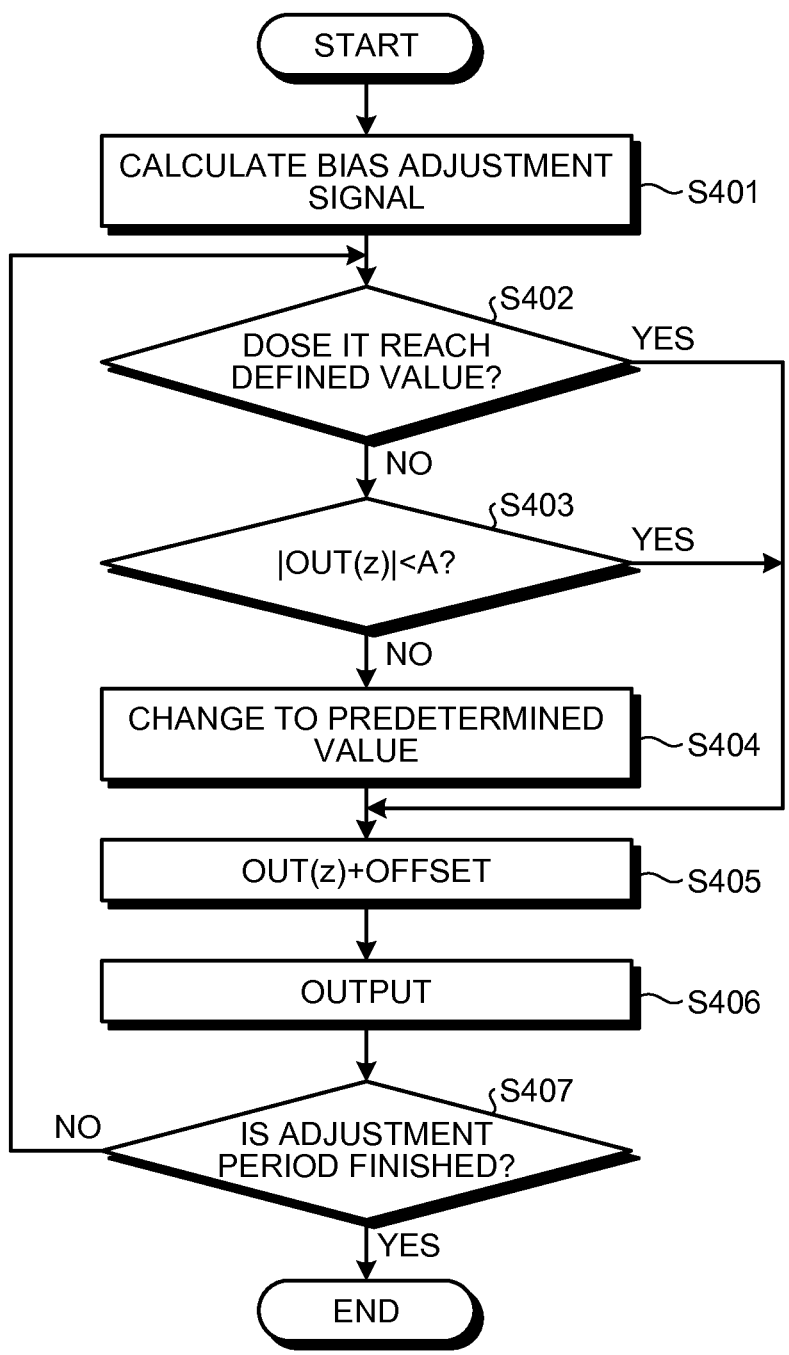
FIG. 18 is a flowchart provided for explaining adjustment processing on a third bias signal.
Figure 19:
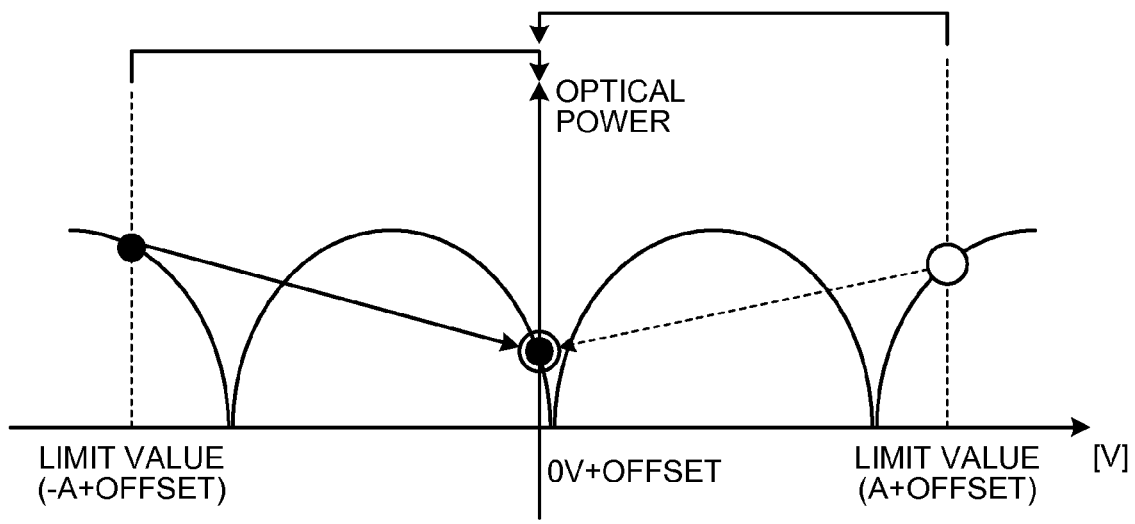
FIG. 19 is a diagram provided for explaining adjustment processing on a third bias signal.

FIG. 18 is a flowchart provided for explaining adjustment processing on the third bias signal in the control unit 301. FIG. 19 is a diagram provided for explaining adjustment processing on the third bias signal in the control unit 301.

In FIG. 19, the horizontal axis represents a voltage value of a bias adjustment signal and the vertical axis represents the power loss of the optical modulation device 300 (i.e. the optical output of the optical modulation device 300). That is, in FIG. 19, the curve line with repetitive increase and decrease in the optical power in the horizontal axis direction represents an optical output characteristic of the optical modulation device 300 with respect to a bias adjustment signal.

When the first adjustment period starts, the processing illustrated in FIG. 18 starts.

In step S401, the bias adjustment unit 311 calculates a bias adjustment signal. To be more specific, the bias adjustment signal is calculated based on following Equation (1).

$$\text{OUT}(z) = a*\text{IN}(z) + b*\text{IN}(z-1) + c*\text{OUT}(z-1) \quad (1)$$

Here, IN(z) represents a detection result that is currently input, IN(z−1) represents a detection result that was previously input, and OUT(z−1) represents a value of a bias signal that was previously calculated. Also, "a," "b" and "c" represent coefficients by which each parameter is multiplied.

In step S402, the bias adjustment unit 311 performs a READY decision. That is, the bias adjustment unit 311 decides whether an optical output of the optical Modulation device 300 reaches a defined value.

When it is decided that it does not reach the defined value (i.e. "No" in step S402), the bias adjustment unit 311 performs a limit decision in step S403. That is, the bias adjustment unit 311 decides whether a value of the bias adjustment signal calculated in step S401 is within the first allowable range.

When it is decided that it is out of the first allowable range (i.e. "No" in step S403), the bias adjustment unit 311 changes the calculated value of the bias adjustment signal to a predetermined value in step S404. That is, in FIG. 19, when it is out of the first allowable range defined by limit values "−A+offset" and "A+offset," the calculated value of the bias adjustment signal is set to a zero value.

Returning to FIG. 18, the bias adjustment unit 311 calculates a bias adjustment signal by adding an offset value to the calculated value or changed value of the bias adjustment signal in step S405 and outputs the calculated bias adjustment signal to the bias supply circuit 135 in step S406.

In step S407, the bias adjustment unit 311 decides whether the first adjustment period is finished.

When it is decided that the first adjustment period is not finished (i.e. "No" in step S407), the adjustment processing returns to step S402.

When it is decided that the first adjustment period is finished (i.e. "Yes" in step S407), the adjustment processing is finished.

Adjustment of First Bias Signal or Second Bias Signal

Figure 20:
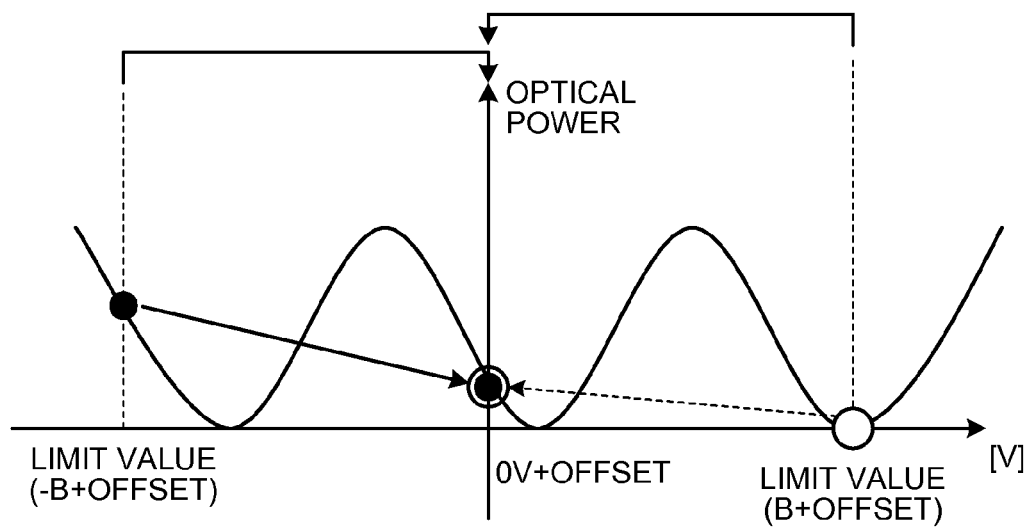
FIG. 20 is a diagram provided for explaining adjustment processing on a first bias signal or a second bias signal.

FIG. 20 is a diagram provided for explaining adjustment processing on the first bias signal or the second bias signal in the control unit 301. Here, this adjustment processing is similar to the adjustment processing with respect to the third bias signal and therefore will be explained using the flowchart in FIG. 18. Also, the adjustment processing with respect to the first bias signal in the second adjustment period and the adjustment processing with respect to the second bias signal in the third adjustment period are similar, and therefore only the adjustment processing in the second adjustment period will be explained below.

When the second adjustment starts, the processing illustrated in FIG. 18 starts.

In step S401, the bias adjustment unit 312 calculates a bias adjustment signal.

In step S402, the bias adjustment unit 312 performs a READY decision.

When it is decided that it does not reach the defined value (i.e. "No" in step S402), the bias adjustment unit 312 performs a limit decision in step S403. That is, the bias adjustment unit 312 decides whether a value of the bias adjustment signal calculated in step S401 is within the second allowable range.

When it is decided that it is out of the second allowable range (i.e. "No" in step S403), the bias adjustment unit 312 changes the calculated value of the bias adjustment signal to a predetermined value in step S404. That is, in FIG. 20, when it is out of the second allowable range defined by limit values "−B+offset" and "B+offset," the calculated value of the bias adjustment signal is set to a zero value.

Returning to FIG. 18, the bias adjustment unit 312 calculates a bias adjustment signal by adding an offset value to the calculated value or changed value of the bias adjustment signal in step S405 and outputs the calculated bias adjustment signal to the bias supply circuit 136 in step S406.

In step S407, the bias adjustment unit 312 decides whether the second adjustment period is finished.

Adjustment of First Drive Signal or Second Drive Signal

Figure 21:
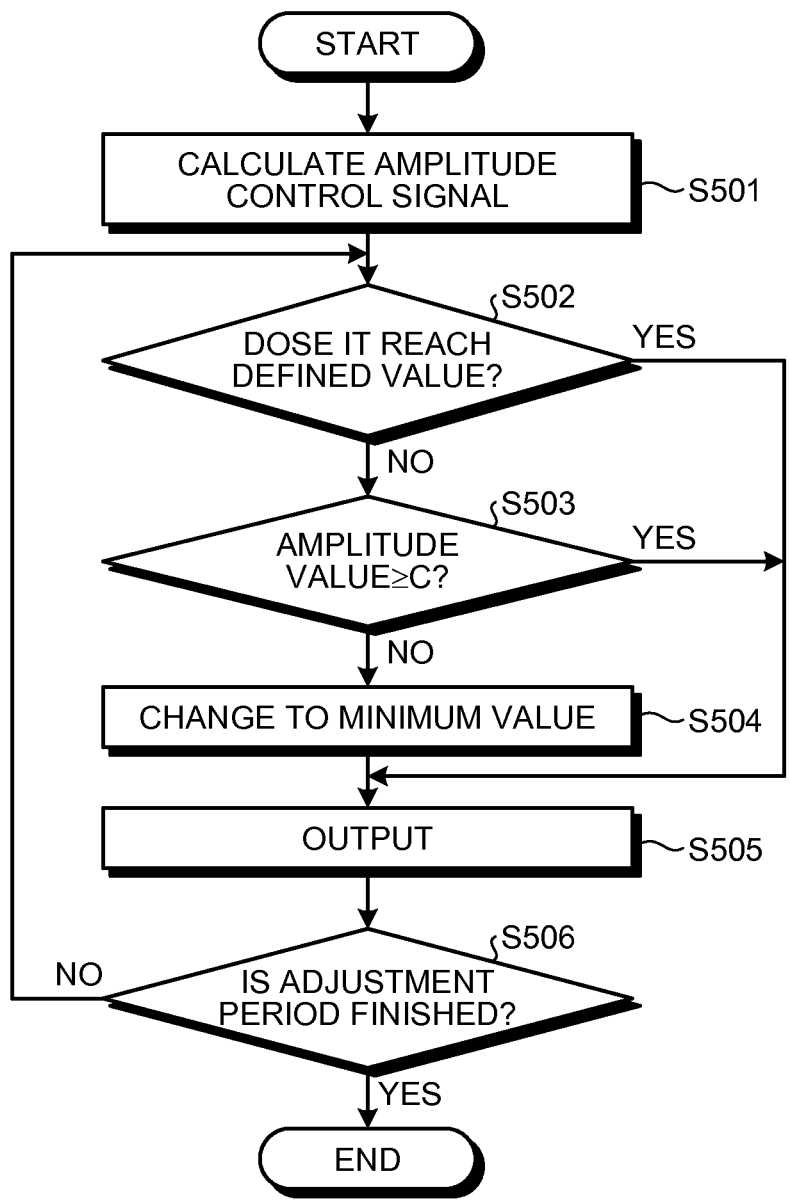
FIG. 21 is a diagram provided for explaining adjustment processing on a first drive signal or a second drive signal.
Figure 22:
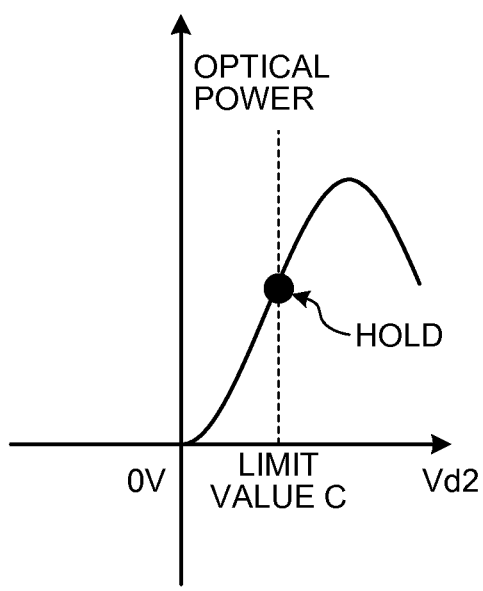
FIG. 22 is a diagram provided for explaining adjustment processing on a first drive signal or a second drive signal.

FIG. 21 is a flowchart provided for explaining adjustment processing on the first drive signal or the second drive signal in the control unit 301. FIG. 22 is a diagram provided for explaining adjustment processing on the first drive signal or the second drive signal in the control unit 301. In FIG. 22, the horizontal axis represents a voltage value of a bias adjustment signal and the vertical axis represents the power loss of the optical modulation device 300 (i.e. the optical output of the optical modulation device 300). Also, the adjustment processing with respect to the first drive signal in the second adjustment period and the adjustment processing with respect to the second drive signal in the third adjustment period are similar, and therefore only the adjustment processing in the second adjustment period will be explained below.

When the second adjustment starts, the processing illustrated in FIG. 21 starts.

In step S501, the amplitude adjustment unit 313 calculates an amplitude control signal.

In step S502, the amplitude adjustment unit 313 performs a READY decision.

When it is decided that it does not reach the defined value (i.e. "No" in step S502), the amplitude adjustment unit 313 performs a limit decision in step S503. That is, the amplitude adjustment unit 313 decides whether a value of the amplitude control signal calculated in step S501 is within the third allowable range.

When it is decided that it is out of the third allowable range (i.e. "No" in step S503), the amplitude adjustment unit 313 changes the calculated value of the amplitude control signal to the minimum value in the third allowable range in step S504. That is, in FIG. 22, when it is out of the defined third allowable range equal to or greater than limit value C, the calculated value of the amplitude control signal is held to the limit value C.

Returning to FIG. 21, the amplitude adjustment unit 313 outputs the calculated value or changed value (i.e. limit value C) of the amplitude control signal to the drive circuit 107 in step S505.

In step S506, the amplitude adjustment unit 313 decides whether the second adjustment period is finished.

As described above, according to the present embodiment, in the optical modulation device 300, the control unit 301 starts the first adjustment period before the optical source 101 emits light.

By this means, it is possible to shorten the time required for the whole ABC control in the optical modulation device 300.

Also, in a case where the target voltage value of the third bias signal (i.e. the voltage value of the bias adjustment signal) is out of the allowable range, the control unit 301 changes the target voltage value to a predetermined value in the allowable range.

By this means, it is possible to prevent a phenomenon that the ABC control does not converge to an operating point near 0 V, from being caused, where the phenomenon may be caused by the start of an adjustment period with respect to the third bias signal before light is emitted.

Also, in a case where the target voltage value of the first bias signal (i.e. the voltage value of the bias adjustment signal) is out of the allowable range, the control unit 301 changes the target voltage value to a predetermined value in the allowable range.

By this means, it is possible to prevent a phenomenon that the ABC control does not converge to an operating point near 0 V, from being caused, where the phenomenon may be caused by the start of an adjustment period with respect to the first bias signal before light is emitted.

Also, in a case where the target voltage value of the first drive signal (i.e. the voltage value of the amplitude control signal) is out of the allowable range, the control unit 301 changes the target voltage value to the minimum value in the allowable range.

By this means, it is possible to prevent a phenomenon that the ABC control does not converge to an operating point near 0 V, from being caused, where the phenomenon may be caused by the start of an adjustment period with respect to the first drive signal before light is emitted.

[d] Fourth Embodiment

Figure 23:
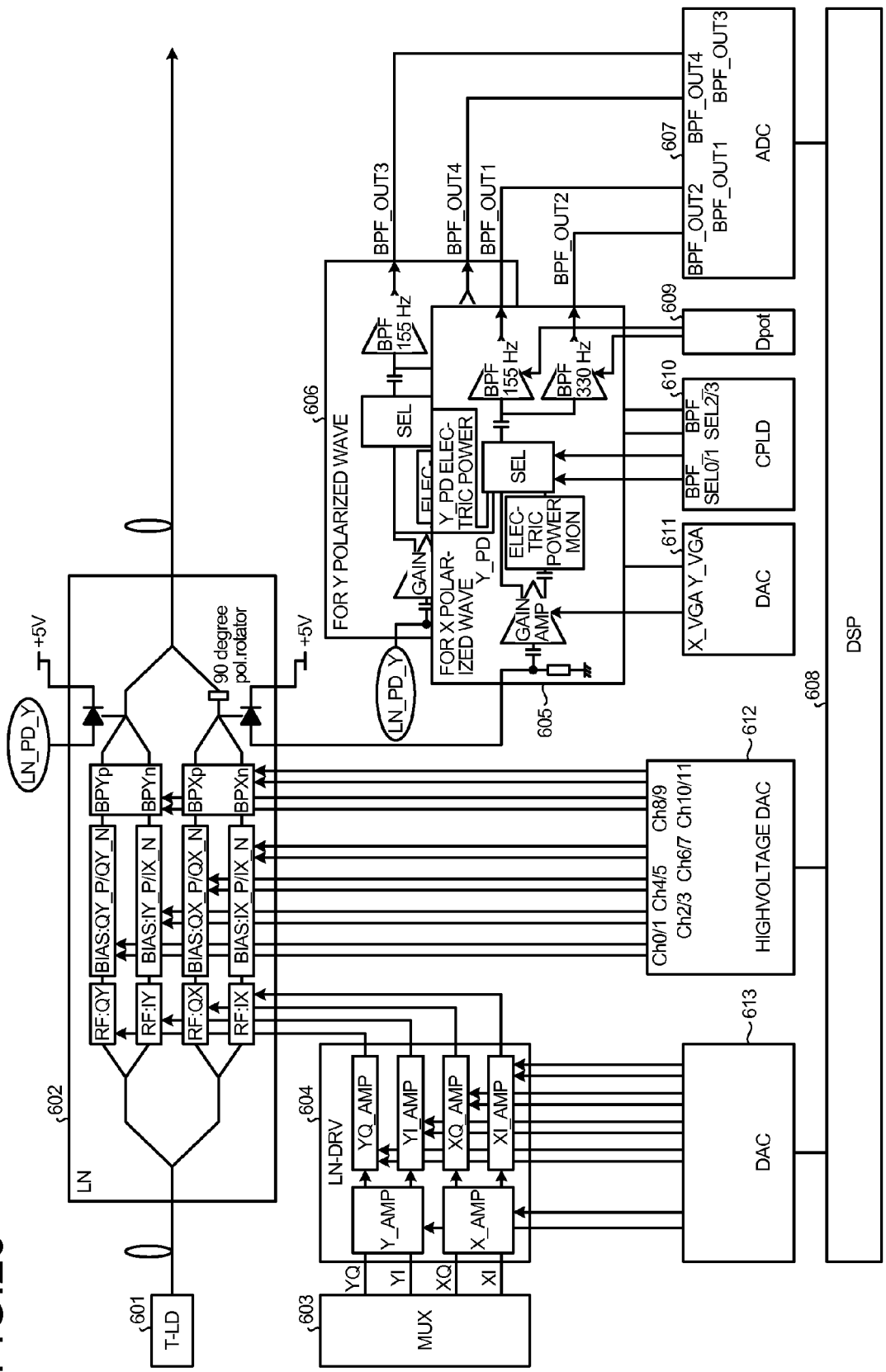
FIG. 23 is a diagram illustrating a circuit configuration example of an optical modulation device.

A fourth embodiment relates to a specific circuit configuration example. FIG. 23 is a diagram illustrating a circuit configuration example of an optical modulation device. The circuit configuration example illustrated in FIG. 23 corresponds to the optical modulation device 200 in FIG. 13.

An T-LD (Laser Diode) 601 in FIG. 23 corresponds to the optical source 101. A block 602 corresponds to the modulation units 102 and 201, the PD monitors 109 and 209 and the 90-degree polarization rotator 205. An MUX 603 corresponds to the MUX 206, and an LN-DRV 604 corresponds to the drive circuits 107, 108, 207 and 208.

Blocks 605 and 609, a CPLD (Complex Programmable Logic Device) 610 and a DAC (digital to analog converter) 611 correspond to the power monitor 110 and the adjustment reference signal forming unit 111. Especially, the CPLD 610 corresponds to the selection control unit 122.

A block 606, a block 609, the CPLD 610 and the DAC 611 correspond to the power monitor 210 and the adjustment reference signal forming unit 211.

An ADC (analog to digital converter) 607, a DSP (Digital Signal Processing) 608 and DACs 612 and 613 correspond to the control unit 212. Especially, the ADC 607 corresponds to the pilot generation units 131 and 137 and the synchronization detection units 132 and 138. The DSP 608 corresponds to the bias adjustment units 133 and 134, the amplitude adjustment unit 139 and the adjustment period control unit 140. The DAC 612 corresponds to the bias supply circuit 135 and the DAC 613 corresponds to the bias supply circuit 136.

According to an aspect of an optical modulation device and optical modulation method disclosed in the present application, it is possible to suppress an occurrence of a rapid change or ringing in an optical output at the time of activation.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical modulation device comprising:
a first modulation unit that includes: a first modulator that forms a first optical modulation signal by modulating a light based on a first drive signal and a first bias signal; a second modulator that forms a second optical modulation signal by modulating a light based on a second drive signal and a second bias signal; and a phase shifter that makes a phase difference between the first optical modulation signal and the second optical modulation signal closer to $\pi/2$ by shifting a phase of the first optical modulation signal with respect to the second optical modulation signal based on a third bias signal, the first drive signal and the second drive signal being superimposed over a first pilot having a first frequency, the first bias signal and the second bias signal being superimposed over a second pilot having a second frequency, the third bias signal being superimposed over a third pilot;
a detection unit that detects the first pilot, the second pilot, and the third pilot included in a synthesized signal synthesizing the first optical modulation signal phase-shifted in the phase shifter and the second optical modulation signal; and
a controller that repeatedly adjusts a signal as a target of adjustment in each of a plurality of adjustment periods, wherein the controller adjusts the third bias signal based on a detection result for the third pilot in a first adjustment period, adjusts the first drive signal and the first bias signal based on a detection result for the first pilot and a detection result for the second pilot in a second adjustment period next to the first adjustment period, and adjusts the second drive signal and the second bias signal based on the detection result for the first pilot and the detection result for the second pilot in a third adjustment period next to the second adjustment period,
wherein the controller controls a length of the first adjustment period to be equal to or greater than one cycle of the third pilot and equal to or less than a time constant at the time of adjustment of the third bias signal, controls a length of the second adjustment period to be equal to or greater than one cycle of the first pilot and equal to or less than a time constant at the time of adjustment of the first drive signal and the first bias signal, and controls a length of the third adjustment period to be equal to or greater than one cycle of the second pilot and equal to or less than a time constant at the time of adjustment of the second drive signal and the second bias signal.

2. The optical modulation device according to claim 1, further comprising:
a second modulation unit,
wherein the controller performs adjustment processing on the first modulation unit and adjustment processing on the second modulation unit in parallel.

3. The optical modulation device according to claim 1, wherein the controller starts the first adjustment period before the light is emitted.

4. The optical modulation device according to claim 3, wherein the controller sets an allowable range of an adjusted value of the third bias signal, calculates an adjusted value of the third bias signal, and changes the calculated adjusted value to a predetermined value in the allowable range when the calculated adjusted value is out of the allowable range.

5. The optical modulation device according to claim 3, wherein the controller sets an allowable range of an adjusted value of the first bias signal, calculates an adjusted value of the first bias signal, and changes the calculated adjusted value to a predetermined value in the allowable range when the calculated adjusted value is out of the allowable range.

6. The optical modulation device according to claim 3, wherein the controller sets an allowable range of an adjusted value of the first drive signal, calculates an adjusted value of the first drive signal, and changes the calculated adjusted value to a minimum value in the allowable range when the calculated adjusted value is out of the allowable range.

7. An optical modulation method comprising: forming, by a first modulator, a first optical modulation signal by modulating a light based on a first drive signal and a first bias signal; forming, by a second modulator, a second optical modulation signal by modulating a light based on a second drive signal and a second bias signal; making a phase difference between the first optical modulation signal and the second optical modulation signal closer to $\pi/2$ by shifting a phase of the first optical modulation signal with respect to the second optical modulation signal based on a third bias signal, the first drive signal and the second drive signal being superimposed over a first pilot having a first frequency, the first bias signal and the second bias signal being superimposed over a second pilot having a second frequency, and the third bias signal being superimposed over a third pilot; detecting, by a detector, the first pilot, the second pilot and the third pilot included in a synthesized signal synthesizing the phase-shifted first optical modulation signal and the second optical modulation signal; and repeatedly adjusting, by a controller, a signal as a target of adjustment in each of a plurality of adjustment periods, wherein the third bias signal, in a first adjustment period, is adjusted based on a detection result for the third pilot, the first drive signal and the first bias signal, in a second adjustment period next to the first adjustment period, are adjusted based on a detection result for the first pilot and a detection result for the second pilot, and the second drive signal and the second bias signal, in a third adjustment period next to the second adjustment period, are adjusted based on the detection result for the first pilot and the detection result for the second pilot; wherein adjusting includes controlling a length of the first adjustment period to be equal to or greater than one cycle of the third pilot and equal to or less than a time constant at the time of adjustment of the third bias signal, controlling a length of the second adjustment period to be equal to or greater than one cycle of the first pilot and equal to or less than a time constant at the time of adjustment of the first drive signal and the first bias signal, and controlling a length of the third adjustment period to be equal to or greater than one cycle of the second pilot and equal to or less than a time constant at the time of adjustment of the second drive signal and the second bias signal.

* * * * *

UNITED STATES PATENT AND TRADEMARK OFFICE
CERTIFICATE OF CORRECTION

PATENT NO. : 9,007,675 B2
APPLICATION NO. : 13/663758
DATED : April 14, 2015
INVENTOR(S) : Akihiro Toya et al.

It is certified that error appears in the above-identified patent and that said Letters Patent is hereby corrected as shown below:

Title page, item (72) Inventors, Line 2

Delete "Sappora" and insert -- Sapporo --, therefor.

Claims

Claim 7, Column 18, Lines 21 - 61

Delete Claim 7 in its entirety and insert therefor

-- 7. An optical modulation method comprising:
forming, by a first modulator, a first optical modulation signal by modulating a light based on a first drive signal and a first bias signal;
forming, by a second modulator, a second optical modulation signal by modulating a light based on a second drive signal and a second bias signal;
making a phase difference between the first optical modulation signal and the second optical modulation signal closer to $\pi/2$ by shifting a phase of the first optical modulation signal with respect to the second optical modulation signal based on a third bias signal, the first drive signal and the second drive signal being superimposed over a first pilot having a first frequency, the first bias signal and the second bias signal being superimposed over a second pilot having a second frequency, and the third bias signal being superimposed over a third pilot;
detecting, by a detector, the first pilot, the second pilot and the third pilot included in a synthesized signal synthesizing the phase-shifted first optical modulation signal and the second optical modulation signal; and
repeatedly adjusting, by a controller, a signal as a target of adjustment in each of a plurality of adjustment periods, wherein the third bias signal, in a first adjustment period, is adjusted based on a detection result for the third pilot, the first drive signal and the first bias signal, in a second adjustment period next to the first adjustment period, are adjusted based on a detection result for the first pilot and a detection result for the second pilot, and the second drive signal and the second bias signal, in a third Signed and Sealed this
Twentieth Day of October, 2015

Michelle K. Lee
*Director of the United States Patent and Trademark Office* adjustment period next to the second adjustment period, are adjusted based on the detection result for the first pilot and the detection result for the second pilot, wherein the adjusting includes controlling a length of the first adjustment period to be equal to or greater than one cycle of the third pilot and equal to or less than a time constant at the time of adjustment of the third bias signal, controlling a length of the second adjustment period to be equal to or greater than one cycle of the first pilot and equal to or less than a time constant at the time of adjustment of the first drive signal and the first bias signal, and controlling a length of the third adjustment period to be equal to or greater than one cycle of the second pilot and equal to or less than a time constant at the time of adjustment of the second drive signal and the second bias signal. --.